United States Patent
Kumar et al.

(10) Patent No.: US 9,822,717 B2
(45) Date of Patent: *Nov. 21, 2017

(54) CONTROL SYSTEM AND METHOD

(71) Applicant: GENERAL ELECTRIC COMPANY, Schenectady, NY (US)

(72) Inventors: Ajith Kuttannair Kumar, Erie, PA (US); Wolfgang Daum, Greenfield, WI (US)

(73) Assignee: General Electric Company, Schenectady, NY (US)

( * ) Notice: Subject to any disclaimer, the term of this patent is extended or adjusted under 35 U.S.C. 154(b) by 215 days.

This patent is subject to a terminal disclaimer.

(21) Appl. No.: 14/862,563

(22) Filed: Sep. 23, 2015

(65) Prior Publication Data
US 2016/0010574 A1 Jan. 14, 2016

Related U.S. Application Data

(60) Continuation-in-part of application No. 13/965,712, filed on Aug. 13, 2013, now Pat. No. 9,151,232, which is a continuation-in-part of application No. 12/984,792, filed on Jan. 5, 2011, now Pat. No. 8,534,199, which is a division of application No.
(Continued)

(51) Int. Cl.
| | |
|---|---|
| *B61C 3/00* | (2006.01) |
| *F02D 41/00* | (2006.01) |
| *B61L 3/00* | (2006.01) |
| *F02D 41/02* | (2006.01) |
| *B61L 3/12* | (2006.01) |
| *F02D 19/06* | (2006.01) |

(Continued)

(52) U.S. Cl.
CPC .......... *F02D 41/0025* (2013.01); *B61L 3/006* (2013.01); *B61L 3/125* (2013.01); *F02D 19/0615* (2013.01); *F02D 41/021* (2013.01); *B60L 2200/26* (2013.01); *B61L 15/0036* (2013.01); *B61L 15/0081* (2013.01); *F02D 29/06* (2013.01); *F02D 2200/604* (2013.01); *F02D 2200/701* (2013.01); *Y02T 10/36* (2013.01); *Y02T 90/16* (2013.01)

(58) Field of Classification Search
CPC .... B61C 3/00; B61C 5/00; B61C 5/02; B61C 5/04; B61L 2210/00
See application file for complete search history.

(56) References Cited

U.S. PATENT DOCUMENTS 9,151,232 B2 * 10/2015 Kumar ................ F02D 19/0639

* cited by examiner

*Primary Examiner* — R. J. McCarry, Jr.
(74) *Attorney, Agent, or Firm* — Global Patent Operation; John A. Kramer

(57) ABSTRACT

A system and method control a powered system having an engine configured to operate using a plurality of fuel types. A first set of control signals including a first set of valve signals are communicated to each fuel tank based at least in part on a first stored engine operating profile to control amounts of fuel provided from each fuel tank to the engine. A different, second set of control signals including a second set of valve signals are communicated to the fuel tanks based at least in part on a second stored engine operating profile to control or change the amounts of fuel from each fuel tank to the engine. The system and method can switch between operating conditions associated with different external domains to alter the engine operating profile used to control the fuel or fuels supplied to the engine.

20 Claims, 10 Drawing Sheets

Related U.S. Application Data

11/680,706, filed on Mar. 1, 2007, now Pat. No. 7,882,789, which is a continuation-in-part of application No. 10/849,314, filed on May 19, 2004, now Pat. No. 7,131,614, and a continuation-in-part of application No. 11/136,769, filed on May 25, 2005, now Pat. No. 7,500,436, which is a continuation-in-part of application No. 11/008,708, filed on Dec. 9, 2004, now Pat. No. 7,302,895, which is a continuation-in-part of application No. 10/354,638, filed on Jan. 30, 2003, now Pat. No. 6,922,619, and a continuation-in-part of application No. 10/435,261, filed on May 9, 2003, now Pat. No. 7,231,877, which is a continuation-in-part of application No. 10/032,714, filed on Dec. 26, 2001, now Pat. No. 6,612,245, said application No. 11/136,769 is a continuation-in-part of application No. 10/849,314, filed on May 19, 2004, now Pat. No. 7,131,614.

(60) Provisional application No. 60/474,151, filed on May 22, 2003, provisional application No. 60/590,853, filed on Jul. 23, 2004, provisional application No. 60/319,128, filed on Feb. 28, 2002, provisional application No. 60/278,975, filed on Mar. 27, 2001.

(51) Int. Cl.
*B61L 15/00* (2006.01)
*F02D 29/06* (2006.01)

| Configuration Input | Operational Inputs | End Use Device Outputs | |
|---|---|---|---|
| H | 1 1 0 0 | 1 0 1 0 1 | Mode 1 |
| L | 1 1 0 0 | 1 1 1 0 0 | Mode 2 |

CONTROL SYSTEM AND METHOD

CROSS-REFERENCE TO RELATED APPLICATIONS

This application is a continuation-in-part of U.S. application Ser. No. 13/965,712, filed 13 Aug. 2013, which is a continuation-in-part of U.S. application Ser. No. 12/984,792, filed 5 Jan. 2011 (now U.S. Pat. No. 8,534,199 issued 17 Sep. 2013), which is a divisional application of U.S. application Ser. No. 11/680,706, filed 1 Mar. 2007 (now U.S. Pat. No. 7,882,789 issued 8 Feb. 2011). U.S. application Ser. No. 11/680,706 is a continuation-in-part of U.S. application Ser. No. 10/849,314 filed 19 May 2004 (now U.S. Pat. No. 7,131,614 issued 7 Nov. 2006) and is a continuation-in-part of U.S. application Ser. No. 11/136,769, filed 25 May 2005 (now U.S. Pat. No. 7,500,436 issued 10 Mar. 2009). U.S. application Ser. No. 10/849,314 claims priority to U.S. Provisional Application No. 60/474,151 filed 22 May 2003. U.S. application Ser. No. 11/136,769 is a continuation-in-part of U.S. application Ser. No. 11/008,708, which was filed 9 Dec. 2004 (now U.S. Pat. No. 7,302,895 issued 4 Dec. 2007), is a continuation-in-part of U.S. application Ser. No. 10/849,314, and claims priority to U.S. Provisional Application No. 60/590,853, filed 23 Jul. 2004. U.S. application Ser. No. 11/008,708 is a continuation-in-part of U.S. application Ser. No. 10/354,638 filed 30 Jan. 2003 (now U.S. Pat. No. 6,922,619 issued 26 Jul. 2005), is a continuation-in-part of U.S. application Ser. No. 10/435,261, filed 9 May 2003 (now U.S. Pat. No. 7,231,877 issued 19 Jun. 2007), and claims priority to U.S. Provisional Application No. 60/590,853. U.S. application Ser. No. 10/435,261 is a continuation-in-part of U.S. application Ser. No. 10/032,714, filed 6 Dec. 2001 (now U.S. Pat. No. 6,612,245 issued on 2 Sep. 2003). U.S. application Ser. No. 10/354,638 claims priority to U.S. Provisional Application No. 60/319,128, filed 28 Feb. 2002. U.S. application Ser. No. 10/032,714 claims priority to U.S. Provisional No. 60/278,975, filed 27 Mar. 2001. All of the foregoing applications and patents are incorporated herein by reference in their entirety.

BACKGROUND

Technical Field

Embodiments of the subject matter described herein relate generally to controllers for powered systems, and methods of operation.

Discussion of Art

Examples of powered systems include stationary power generators, mining equipment, marine vessels, and vehicle systems. Modern vehicles, particularly industrial equipment, may contain multiple operating systems including computerized controls responsive to a large number of input variables. These powered systems may include only one fuel source. Engines may be optimized with respect to that single fuel source. For instances where there are a plurality of fuel sources for a single engine, these fuel sources may be used in discrete and static flow rates.

It may be desirable to have a controller and method for powered systems that differ from those controllers and methods that are currently available.

BRIEF DESCRIPTION

In one embodiment, a system is provided for controlling a powered unit having an engine configured to operate using a plurality of fuel types each in a corresponding fuel tank. The system includes a controller operable to transmit a first set of control signals including a first set of valve signals to the each fuel tank based at least in part on a first stored engine operating profile to control amounts of fuel from each fuel tank to the engine. The controller can also transmit a second set of control signals including a second set of valve signals to each fuel tank based at least in part on a second stored engine operating profile to control amounts of fuel from each fuel tank to the engine. Further, the controller can switch, by transmitting either the first set of control signals or the second set of control signals, between a first operating condition associated with a first external domain and a second condition associated with a second external domain. The first operating condition is associated with the first stored engine operating profile, and the second operating condition is associated with the second stored engine operating profile.

In one embodiment, a method is provided for controlling a powered unit having an engine. The engine can operate on a plurality of fuel types. The method includes transmitting a first set of control signals to a plurality of fuel tanks based at least in part on a first stored engine operating profile to control amounts of fuel flowing from each of the plurality of fuel tanks to the engine. Next, a second set of control signals is transmitted to a plurality of fuel tanks based at least in part on a second stored engine operating profile to control amounts of fuel flowing from each of the plurality of fuel tanks to the engine. The method includes switching between a first operating condition associated with a first external domain and the first stored engine operating profile and a second operating condition associated with a second external domain and the second stored engine operating profile.

DETAILED DESCRIPTION

Figures 1, 2:
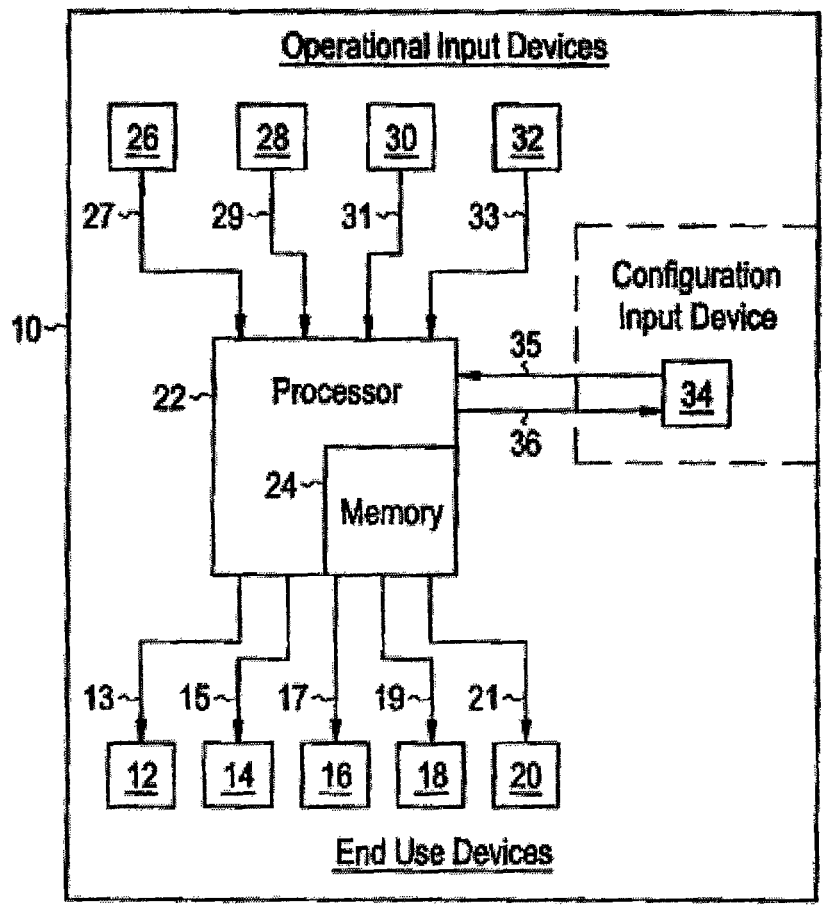
FIG. 1 is a block diagram of a control system of a fueled power generating unit including a configuration input.
FIG. 2 is a table illustrating the relationship between control system inputs and outputs for two configuration modes of the fueled power generating unit of FIG. 1.

Embodiments of the subject matter described herein relate to controllers for powered systems, and associated methods of operating the powered systems. These powered systems may be powered units, such as vehicles, that have plural fuel tanks each holding a different fuel type. Different types of fuels can include fuels made of different chemicals, fuels having different forms (e.g., gas versus liquid versus solid), fuels having different combustion temperatures, fuels that generate different emissions or different amounts of emissions, etc. The controller may provide dynamic instruction to the powered unit to operate the engine using various combinations of the fuel types in response to some requirement, constraint, or external domain. As used herein, an external domain (disclosed more fully hereinbelow) refers generally to a desired engine operating state produced by a flow rate and blend ratio of two or more fuels and responsive to some external factor. These factors may include, for example, an emissions regulatory scheme for a particular location or a heightened mission criticality needing reduced engine stress (to lower the chance the engine will fail during operation). As the external domain changes, one or more embodiments of the systems and methods disclosed herein make corresponding changes to operation of the engine to meet the needs, requirements, or restrictions of the new external domain. As an example, a controller can cause an engine to switch between a first operating condition associated with a first external domain and a second condition associated with a second external domain by transmitting either a first set of control signals or a second set of control signals.

The terms configuration or operating condition are used herein to describe the overall operating profile of a power generating unit (also referred to herein as a powered unit), including operating characteristics and the manner in which the operating systems of the power generating unit are controlled in response to operational inputs. A configuration of a power generating unit may include performance variables such as the peak output rating of the engine; the correlation between the throttle notch settings and the percentage of full power generated; engine emissions curves; acoustic emissions; electro-magnetic emissions; the number of traction motors used; fuel economy performance; adhesion limits; the organization; presentation and functionality of operator controls; communications protocol; auxiliary functions; etc.

Though embodiments may be at times described with respect to rail vehicles, embodiments are applicable for other uses, such as but not limited to construction and mining vehicles, other off-highway vehicles (e.g., vehicles that are not designed or not legally permitted for travel on public roadways), automobiles, marine vessels, and stationary units, each which may use a fueled engine. Toward this end, when discussing a specified mission, the mission may include a task or requirement to be performed by the powered system. Therefore, with respect to vehicles, a mission may refer to the movement of the system from a present location to a destination location. In the case of stationary applications, such a power generating station or network of power generating stations, a specified mission may refer to an amount of wattage (e.g., MW/hr) or other parameter or requirement to be satisfied by the powered system. Likewise, operating condition of the fueled power generating unit may include one or more of speed, load, fueling value, timing, etc.

In an example involving marine vessels, a plurality of tugs may be operating together where all are moving the same larger vessel, where each tug is linked in time to accomplish the mission of moving the larger vessel. In another example, a single marine vessel may have a plurality of engines. Mining equipment or off highway vehicles (OHV) may involve a fleet of vehicles that have a same mission to move from location A to location B, where each OHV is linked in time to accomplish the mission. With respect to a stationary power generating station, a plurality of stations may be grouped together collectively generating power for a specific location and/or purpose. In another embodiment, a single station may include a plurality of generators.

FIG. 1 is a block diagram of a control system of a powered system 10 that can be operated in one of several configurations in order to better match the powered system to a particular mission. The operating systems of a fueled power generating unit, include a plurality of electrical and mechanical components 12, 14, 16, 18, 20. The components, or end-use devices, may include pumps, valves, lamps, semiconductor devices, switches, motors, compressors, dissipators (such as resistance grids), energy storage batteries for hybrid powered systems, etc. These components form groups and are part of respective systems, such as the fuel system, cooling system, braking system, diagnostic systems, operator control panels, and the like. The components may include elements located off-board the system, such as an off-board planning or reporting element, for example. A controller 22 can represent hardware circuitry that includes and/or is connected with one or more processors (e.g., microprocessors, field programmable gate arrays, integrated circuits, or other electronic logic-based devices). The controller 22 has one or more processors for executing operating instructions stored in a memory 24, and controls the components via control signals 13, 15, 17, 19, 21. A plurality of operational input devices 26, 28, 30, 32 may communicate with the controller to provide a respective plurality of input signals 27, 29, 31, 33 to the processor. The input devices may be sensors, systems or other components located primarily on-board the fueled power generating unit, and in some embodiments, off-board of the system. The stored instructions may be programmed so that the components may be controlled in a predetermined manner in response to the operational inputs. Thus, the instructions executed by controller operate as a transfer function to convert a set of input signals 27, 29, 31, 33 to a set of output signals 13, 15, 17, 19, 21.

A fueled power generating unit, such as a powered system 10 of FIG. 1, includes a configuration input device 34 different from the operational input devices (26, 28, 30, 32) connected to the controller 22 for generating a configuration input signal 35, with the configuration input signal 35 having at least two state sets and being different from the input signals (27, 29, 31, 33). The controller 22 of FIG. 1 includes executable instructions that allow the relationship between at least one of the possible sets of operational input states (e.g., one set of values of 27, 29, 31, 33) and the respective mode of control of the components (e.g., the set of values of 13, 15, 17, 19, 21) to be varied in response to the value of the configuration input signal 35. In other words, the controller may be configured to operate as two or more different transfer functions, with the selection of the transfer function being responsive to the configuration input signal 35. Thus, a fueled power generating unit with two or more distinct configurations may be provided, such as two or more different ratios of fuel in a multi-fuel system. Note that FIG. 1 illustrates the configuration input device 34 as being on-board the system; however the dotted lines illustrate an embodiment where the configuration input device may be located off-board of the system, with the configuration input signal 35 being provided to the powered system via a suitable communication link.

In FIG. 2, two different modes of operation of the powered system 10 are shown for two different configuration input state sets. When the configuration input 35 has a high value H and the four operational inputs 27, 29, 31, 33 have values of 1, 1, 0 and 0, respectively, the controller 22 will implement a first transfer function to produce output signals 13, 15, 17, 19, 21 having respective values of 1, 0, 1, 0, and 1 to control the five components in a first mode. This relationship may be in accordance with a first configuration of the system 10, such as when the system 10 is operating under a first emissions limit (that prevents the system 10 from generating more than a designated amount of emissions). In contrast, when the configuration input 35 has a low value L and the four operational inputs 27, 29, 31, 33 have those same values of 1, 1, 0 and 0 respectively, the controller 22 can implement a second transfer function to produce output signals 13, 15, 17, 19, 21 having respective values of 1, 1, 1, 0 and 0, thereby controlling the five components in a second mode that is different than the first mode. This relationship may be in accordance with a second configuration of the system 10, such as when the system 10 is operating under a different, second emissions limit that is different than the first emissions limit. The difference in the control signals provided to the components 12, 14, 16, 18, 20 between these two modes allows the fueled power generating unit, such as the system 10, to be configured in two different ways in response to the configuration input variables. Modern fueled power generating unit and powered system embodiments may include many such inputs and outputs, including more than one configuration input variable, and including both analog, digital, neural network and/or fuzzy logic circuitry. Portions of the processing may be accomplished off-board of the fueled power generating unit, such as a powered system and communicated to an on-board device for further processing or direct component control. Furthermore, the controller may provide an input signal 36 to the confirmation input device 34, such as feedback from a learning function used to modify an input behavior. In one embodiment, a time series infinite polynomial Taylor function may be used to modify a sensor function. A learning function implemented by controller may further learn in a first manner in one configuration and in a second manner in a second configuration. A distributed learning function may be accomplished on-board the powered system.

The controller 22 may use a fuzzy logic controller (FLC) to determine which of the different modes to control the system 10 according to. The FLC may be a knowledge-based system in which the knowledge of powered system operators, powered system engineers or knowledge gained from a fleet of powered systems has been used to synthesize a closed loop controller for the powered system. Such FLCs may be derived from a knowledge acquisition process, but may be automatically synthesized from a self-organizing control architecture. It may be appreciated that the powered system sensors used by an FLC may be less expensive and may require relatively less precision than the sensors used by a traditional non-fuzzy controller due to the distinct granularity level with which the control laws may be processed by the FLC. Fuzzy logic may be used in a powered system to make decisions and provide measurement and/or control outputs based on one or more inputs of an analog nature in accordance with a set of inferencing rules. Fuzzy logic can make "best guess" decisions in circumstances where input data may be incomplete and/or inconsistent. It may be contemplated that a FLC can enable the owner of a fleet of powered systems to customize powered system operation for any given application. Powered system parameters may be stored in a suitable memory, and control functions may be performed in control logic. A portable receiver/transmitter may be utilized to transfer information to the powered system controller by way of a communications link. The core structure of the fuzzy logic controller may be virtually identical for a myriad of powered system applications. Application-specific definitions of both fuzzy logic membership functions and/or fuzzy logic rules may be input to the controller as a set of parameters, such that the fuzzy logic controller (e.g., the controller 22) may be programmably reconfigurable without changing the actual fuzzy logic. In one example embodiment, a configurable powered system may include one or more fuzzy logic processors as the controller 22, with the one or more processors configured to generate one or more transfer functions or executable instructions for relating the input signals to the output control commands during a given configuration mode.

The controller 22 optionally may include or represent a neural network controller having a neural network estimator for generating one or more estimated transfer functions. The neural network estimator may receive selected sensed powered system operating parameters from various sensors, such as speed, emissions, notch level, tractive effort, etc., to generate an estimated transfer function that may be coupled to an actuator system. In another example, the neural network estimator can be coupled to receive inputs from processors generating computed values of powered system operating parameters (e.g., from other neural networks, fuzzy logic controller, or powered system models programmed in a processor of the controller) in addition to sensed parameters. The neural network estimator may be a nonlinear estimator that can be trained to map a selected range of input signals so as to generate a desired output parameter that varies in correspondence with the input signals.

An optimized design may make coordinated use of all input, output and control variables, and may be organized to ensure a stable powered system controller that can be logically changed (e.g., reconfigured) to meet a set of desired performance objectives for the powered system. In one embodiment, optimal control techniques may be attractive since such techniques can readily handle multi-input systems and allow appropriate candidate values for a control law matrix to be quickly determined Optionally, a sensor may be installed for sensing a powered system state or an estimator may be used for estimating any missing states rather than sensing or measuring the powered system state. In one embodiment, one may make use of optimal estimation techniques as a tool in the design of a multivariable powered system estimator that may be used in conjunction with the powered system controller.

In one embodiment, the configuration input signal 35 may respond to geographic location of the fueled power generating unit, such as powered system 10. For example, the signal 35 may represent the location of the powered system 10. The location of the powered system may be determined using an appropriate input device 34, such as a global positioning system (GPS) receiver, a wireless antenna, or a wireless wayside automatic electronic identification (AEI) tag, for example. Alternatively, the configuration input signal 35 may be indicative of the health of the powered system 10, such as may be derived from on-board or off-board equipment, including diagnostic and/or control systems. Alternatively, the configuration input may represent an operator input, such as when the configuration input device 34 may be an operator-controlled switch, computer mouse, touch screen, keyboard, identification card reader, bar code reader, etc., with or with the requirement for a password or key. In addition to the operator being located onboard the powered system, configuration of the powered systems may be controlled from a location that is off-board the powered system, such as at a control tower, or remote from the powered system such as from a remote data center or dispatch office.

In one embodiment, a signal indicative of the health of one powered system of a vehicle consist may be used to reconfigure a second powered system in the vehicle consist. A vehicle consist includes two or more vehicles (e.g., powered systems) that travel together. The vehicles in the consist may be mechanically coupled with each other (e.g., by couplers, such as in a train) or may be separated from each other (e.g., by automobiles or mining vehicles communicating with each other to coordinate their respective movements so that the consist travels from the same starting location to the same destination location). For example, when a maximum power generating capacity of the first powered system becomes degraded, the second powered system may be reconfigured to a higher peak power level to make up for power lost from the first powered system. A signal indicative of an emission limit may be received from a central emission control center and may be used to configure the vehicle to operate within that emission limit. The configuration input may include a device that changes an analog or digital signal; for example, altering, adding or deleting a message, changing a message sequence, or offsetting a sensor signal to cause the powered system to operate in a different configuration.

The configuration input may represent an operator input. For example, an operator of the fueled power generating unit, such as a powered system may implement a different configuration upon identifying that the powered system may be entering a different area having different configuration requirements, such as by recognizing a milepost marker or other rail side indicia that is indicative of a boundary of the different area. In another embodiment, configuration inputs for changing a configuration may be pre-programmed based on distance of the powered system from a different operation area. For example, an operator may input a distance from a present location of the powered system to a different operational area. Then, based on a sensed distance traveled, the powered system may automatically change its operating configuration upon traveling the distance to arrive at the different area.

Figure 8:
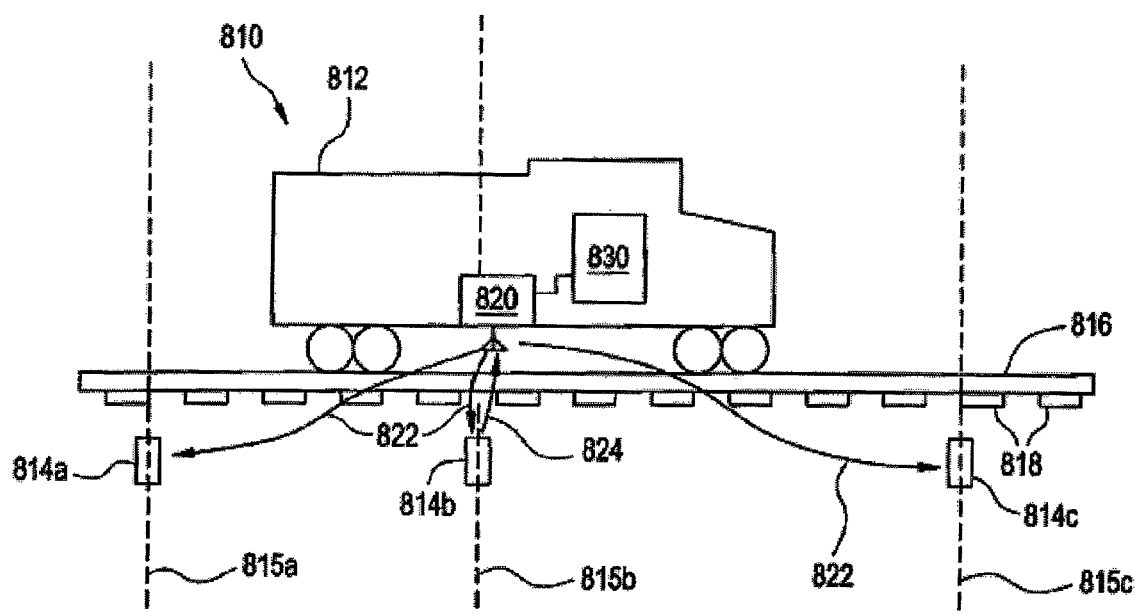
FIG. 8 is an illustration of operating a fueled power generating unit as a function of the location of the fueled power generating unit according to one embodiment.

FIG. 8 shows a system 810 for controlling a fueled power generating unit, such as an operating condition or an emission parameter, in response to information encoded in transponders 814*a*, 814*b*, 814*c* positioned along the path 816. For example, the transponders 814*a*, 814*b*, 814*c* may be positioned at predetermined boundaries 815*a*, 815*b*, 815*c* to identify the boundary to a powered system 812 passing the boundary 815*a*, 815*b*, 815*c*. The powered system 812 may represent the system 10, such as a vehicle. Suitable transponders 814*a*, 814*b*, 814*c*, such as radio-frequency identification (RFID) tags may be positioned in the bed of the path 816 at a location where a powered system operating condition may be controlled. The transponder 814 may be attached to a tie or other object 818 located at an entrance to a rail yard area or other location to limit the speed of the powered system 812. The powered system may be equipped with a transponder reader 820 to read the information encoded in each transponder 814*a*, 814*b*, 814*c* that powered system passes while traveling along the path. While the following describes a reader located on the powered system, it should be understood that the reader may be installed on any car or powered system on a train. In some instances, the powered system operates without an attached car or another powered system and, thus, the powered system itself then constitutes the vehicle consist or train. The reader may be configured to provide control information read from a transponder to a controlling powered system of the train, or to a remote control operator.

In one embodiment, the reader may radiate a radio frequency (RF) activation signal 822 that may be received by the transponder 814*b*. The activation signal 822 provides sufficient energy to the transponder to allow the transponder to radiate a transponder signal 824 back to the reader. The transponder signal 824 may typically be an RF signal having a frequency different than that of the activation signal. The transponder may also be powered by another suitable source of power, such as batteries, solar power, or a line to a power source. Typically, the reader must be located within a suitable detection distance from the transponder, for example, within ten feet (3.048 meters), to receive the transponder signal. Accordingly, transponders may need to be spaced at distances greater than such detection distance to prevent interference among transponders. Unique identifiers for the communication of each transponder with the reader may also be used to allow for closer spacing of transponders.

The reader may be in communication with an onboard control system 830, such as a powered system control unit (LCU) that controls the powered system. After reading a transponder, the reader provides the control information encoded in the transponder signal to the onboard control system to control the operating parameters of the powered system. The powered system may then maintain these same operating parameters until another transponder 814*c* may be passed, and new control information may be received. The control information received from each transponder may be directly provided to the onboard control system for automatic control of the powered system.

In an aspect, two or more sequentially positioned transponders may be configured to provide control information dependent on the direction of powered system travel with respect to the transponders. For example, transponder 814*a* may comprise a pair of transponders positioned at the boundary to provide control information to control the operating parameters of the powered system depending on a direction of travel along the rail, such as if the powered system may be entering or leaving an area 817 bounded by the boundary 815. A boundary may include a state line between two states requiring different operating profiles. As the powered system detects leaving one state and entering an adjacent state by passing, for example paired transponders in a certain direction, the powered system may be instructed to change an emissions parameter corresponding to the requirements of the state it has just entered. In another aspect, the reader may be mounted on a different powered system or rail car of a train of which the powered system may be a member. For example, the powered system being controlled may be a member of consist of a train, wherein the different powered system may be a member of the consist. The different powered system detects its location and transmits the location to the powered system for controlling the powered systems emissions responsive to the location information provided by the different powered system. For example, during travel of the system 10, 812 in a first area having a first emissions limit, the system 10, 812 can operate in a first mode that allows the system 10, 812 to generate emissions at a level that is no more than the first emissions limit. Responsive to entering into a different, non-overlapping second area having a lower second emissions limit, the system 10, 812 can change to operating in a different, second mode that prevents the system 10, 812 from generating emissions at a level that is greater than the second emissions limit. One or multiple aspects of the fueled power generating units, such as a powered systems performance, may be altered to change the powered systems configuration in response to a change in the configuration input. In one embodiment, the powered system may be reconfigured from a first horsepower rating to a second horsepower rating in response to a configuration input change.

Another embodiment may have a number of traction motors that may be powered by the fueled power generating unit, such as a powered system or the power level setting of the traction motors. In a first configuration, every traction motor on the powered system may be powered, such as would be needed for normal open road load hauling missions. In a second configuration, fewer than all of the traction motors may be powered. This may be accomplished using instructions executable by the computing device to permit the powering of a first number of the traction motors of the powered system when the configuration input has a first value and to permit the powering of less than the first number of traction motors of the powered system when the configuration input has a second value. Similarly, the power level of the active traction motors may be varied in response to a configuration input variable.

One embodiment may be utilized in a fueled power generating unit, such as a powered system consist where a plurality of powered systems may be joined together to pull a train. All of the powered systems in a consist may be typically controlled by a single operator from a lead powered system in the consist, with the trailing powered systems being in communication with the lead powered system and responding to input from the operator. Each powered system exhibits a maximum adhesion limit, which can represent an amount of power that can be applied to the wheel of the powered system before wheel slip will occur. If all of the powered systems may not be the same type and therefore have different adhesion limits, situations can arise where uncontrolled wheel slip may occur if the lead powered system has a different adhesion limit than a trailing powered system. One embodiment includes instructions executable by the system 10, 812 to operate an engine of a powered system so that a first amount of power is generated or applied to a wheel responsive to the configuration input having a first value (representative of a first adhesion limit of a vehicle) and to operate the engine of the powered system so that a lesser, second amount of power is generated or applied to the wheel responsive to the configuration input having a different, second value (representative of a lower, second adhesion limit of the same vehicle). This can allow for a lead powered system having a higher adhesion limit than a trailing powered system to be reconfigured to operate as if the lead powered system has the same adhesion limit as the trailing powered system and thereby eliminate or reduce problematic wheel slip concerns. The configuration input signal 35 may respond to any operating parameter of another powered system in the consist. For example, a signal indicative of the power level or of the health of a trailing powered system may be used as a configuration input signal for reconfiguring a lead powered system to a respective peak power level responsive to the signal.

The control systems of a fuel power generating unit, such as a powered system may be programmed to respond in accordance with a predetermined set of mission priorities. For example, the mission priority for an express road powered system may be to maintain the desired power output in order to ensure that a desired speed is sustained so that an express delivery schedule can be satisfied. There may be situations where doing so may cause excessive wear, excessive emissions, or other undesirable effects. For example, if one cylinder of the engine becomes inoperative, the predetermined mission priorities will determine whether the system will provide additional fuel to the operating cylinders to compensate for the inoperative cylinder. Doing so may result in the engine exceeding an emission limit or may cause excessive wear on the engine.

For a non-express service powered system, the mission priority may be to operate at all times within an emissions limit, or within a required fuel consumption limit, etc. For such non-express service, the mission priorities may simply allow the peak engine output to drop when one engine cylinder becomes inoperative. The embodiment may allow a single powered system to be reconfigured from a first set of mission priorities to a second set of mission priorities in response to a change in value of a configuration input. For example, the configuration input can include the priority of the mission (e.g., complete travel within an allotted or scheduled time versus generate emissions below a designated limit), and the operating mode of the system can be changed to ensure that the system operates within the restriction or limitation represented by the configuration input. This embodiment can provide for additional flexibility for a railroad dispatcher in matching available equipment with mission requirements.

In one embodiment, the system 10, 812 may control one or more operations of the fueled power generating unit, such as a powered system as a function of an operating profile, with the operating profile being made responsive to the configuration input value. An operating profile may be an operating profile that describes and defines the desired emissions performance of the powered system verses power output. For example, an emissions profile may include one or more emissions requirements, such as a maximum allowable value of an emission. An emission requirement may be variable based on a time of day, a time of year, and/or atmospheric conditions such as weather or pollutant level in the atmosphere. Emissions regulations may vary geographically across a railroad system. For instance, an operating area such as a city or state may have specified emissions objectives, and an adjacent operating area may have different emission objectives, for example a lower amount of allowed emissions or a higher fee charged for a given level of emissions. Accordingly, an operating profile for a certain geographic area may be tailored to include maximum emission values for each of the regulated emission including in the profile to meet a predetermined emission objectives required for that area.

The selection of a fueled power generating unit, such as a powered system for a mission may be complicated if the route crosses multiple areas with differing emissions limitations. In other embodiments, the operating profile or emission objective/characteristic may be a function of the time of day, weather, daily emission rating/classification, train pull weight, consist configuration, movement plan or schedule, route conditions, age or type of powered system, and/or business objective of the route system operator. The operating profile can dictate or restrict operations of the powered system as a function of time, distance (e.g., along a route), location, weather, system weight, system configuration, schedule, age of the system, or the like. For example, different locations may have different restrictions on emissions that may be generated, different weather conditions may restrict the system to traveling at different speeds, the systems may operate with a wider range of operating settings (e.g., power output, speeds, etc.) at different ages, etc.

In one example, an emission parameter of an operating powered system may be compared to the operating profile for a particular area. The emission parameter can represent the amount of emissions being generated or that has been generated by the powered system. A process executed by the system 10, 812 may determine if an adjustment to one or more operating characteristics or operational settings of the powered system may be required in order to keep or cause the powered system operating within the restrictions dictated by the operating profile. The operating profile may be associated with a gaseous, liquid, or solid byproduct of combustion, with an acoustic energy emission, a reflective emission, such as provided by a device for reflecting or absorbing electromagnetic energy, vibration emissions, and/or an electro-magnetic energy emission, such as radio, infrared, and visible light emissions. For example, if the monitored emission parameter may be a chemical or gas output of the diesel engine and it may be monitored as being higher than specified by the emission objective, the system 10, 812 may execute instructions to control engine/fuel system components such as to change the engine timing or fuel delivery schedule or another control intended to reduce the emissions being generated by the engine. Other corrective actions may include shutting down the engine, adjusting powered system assignments within a consist, adjusting one or more movement plans for the powered system, changing engine cooling, changing engine load or tractive effort, changing the engine speed, utilizing hybrid energy for motoring, or storing hybrid energy in an energy storage system. Such action may be taken to achieve the emission characteristic for a particular powered system or may be taken on a system wide or sub-system basis in order to achieve an emission objective for a fleet of powered systems operated by an operator operating in one or more operating areas.

In one embodiment, the emissions configuration of one or more fueled power generating units are managed. For example, if a first operating area may be an emission control area requiring a specified emission characteristic, the controller 22 manages the operation of the powered system 10, 812 (e.g., control outputs 13, 15, 17, 19, 21) in accordance with a first operating profile that will satisfy the objective when a location configuration input has a first value (e.g., when the system is in the first operating area, the system is controlled to generate no more emissions than is allowed in the first operating area). When the configuration input 35 changes value in response to movement of the powered system into a second operating area having a different emissions objective, the computing device controls the operation of the powered system in response to a different operating profile (e.g., at least one different output value 13, 15, 17, 19, 21 for the same set of input values 27, 29, 31, 33). For example, the system can be controlled to generate no more than a different amount of emissions than is allowed in the second operating area).

Figure 3:
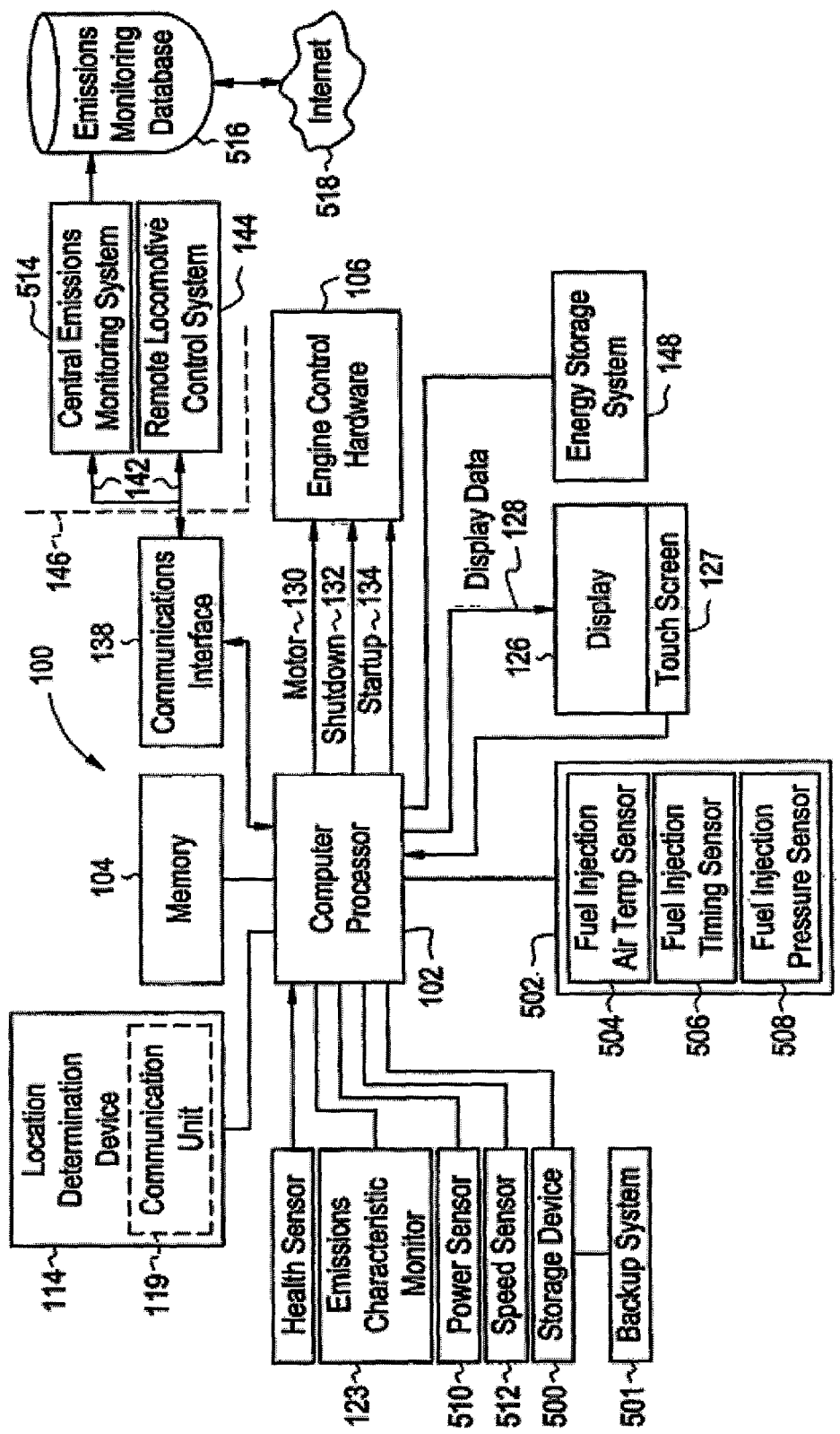
FIG. 3 is a block diagram of a powered system in accordance with one embodiment.
Figure 4:
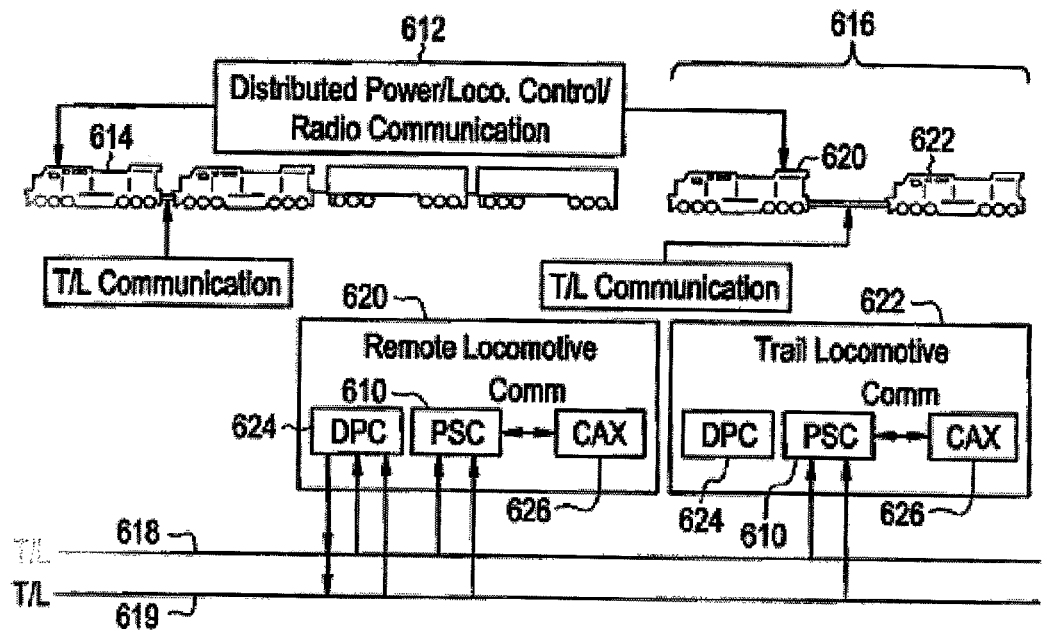
FIG. 4 is a schematic illustration of a vehicle system embodying aspects of the inventive subject matter for selectably controlling the level of tractive effort produced by a fueled power generating unit.

In an aspect illustrated in FIG. 3, a powered control system may include an emission characteristic monitor or sensor 123 coupled to one or more computer processors 102 for monitoring emissions exhausted by the powered system, such as oxides of nitrogen (NOx), carbon monoxide (CO), carbon dioxide (CO2) and particulates. The system may also include an emission operating parameter monitor 502 coupled to the computer processor 102 for monitoring powered system operating parameters indicative of operating profiles. The emission operating parameter monitor 502 may further include a fuel injection air temperature sensor 504, a fuel injection timing sensor 506, and a fuel injection pressure sensor 508 for monitoring these respective parameters. These parameters may be used to calculate an emission level of a monitored engine. In another aspect, a horsepower, (or equivalent power measurement, such as megawatt-hours) produced by the powered system and a speed of the powered system may be monitored, for example, at certain times (such as every 0.1 hour) and/or at certain locations by power sensor 510 and speed sensor 512, respectively. As may be known, such horsepower and speed information may be used to calculate an emissions profile of the powered system over the period that such information may be recorded. The operating profile may be correlated to location information to show where the powered system is or was located when producing the various different amounts of emissions. Other parameters, such as fuel usage and engine exhaust characteristics may be monitored for example, by a fuel usage sensor and an engine exhaust characteristic sensor, respectively.

The powered control system may communicate with a central emissions monitoring system 514. The central emissions monitoring system 514 can include hardware circuitry that includes and/or is connected with one or more processors (e.g., microprocessors, field programmable gate arrays, integrated circuits, or other electronic logic-based devices). The system 514 may be coupled to a central emission monitoring database 516, such as a central database used to monitor powered system parameters or outputs. The central emission-monitoring database 516 may have secured accessibility, for example, via the Internet 518 or another network. The central emissions monitoring system 514 may receive emission information from one or more powered systems over secure communication link 142 to track emissions of respective monitored powered systems. In one embodiment, emission information provided by each powered system may be stored in the database 516 in addition to, or instead of, being stored locally on the storage device of the powered system. The information may be provide to the central emissions monitoring system 514 as the information may be acquired, or the information may be uploaded from the powered system on a periodic basis.

The system may operate a fueled power generating unit differently while in different regions. The system may be programmed to limit interruption of the powered system performance while transitioning to a different operating profile configuration. The system provides the ability to record and maintain a record of the date and time that a powered system enters and exits a pre-defined region, and/or a record of various system operating parameters, such as parameters indicative of emission generated by the engine, for example. Memory may be used to record portions (e.g. as measured by clock time, fuel consumed, location, etc.) of the powered system operation in each available mode of operation, such as may be useful for subsequent tax reporting, billing or fleet management purposes.

Additionally, no modification of engine control hardware may be needed. In the event of a malfunction of the configuration input device (e.g., the location determination device 114), the controller may instruct the powered system to revert to a default emissions profile, alternatively, the emissions profile of the last known configuration input may be used. Data may be redundantly stored or backed up and time stamped at periodic intervals. The configuration of the powered system may be changed in response to a configuration input signal that originates from the off-board central emissions monitoring system 514, such as when the emission data for the fleet or for the particular powered system 100 requires or allows a change in the operating profile for the powered system. Alternatively, the configuration of the powered system may be changed by operator input, such as via input to a touch screen device or other input device 127.

In one aspect, the stored emissions information for each power generating unit may be made available to a regulatory taxing agency, such as a taxing authority or environmental regulation authority, to verify emission compliance while the powered system, or a fleet of powered systems, may be operating in a certain area. Emission information may be provided for a powered system as it crosses a boundary of a predefined region, and/or provided for the period of time that the powered system operates within the region may be provided. For example, a state may require a certain emissions profile be maintained while a powered system may be operating within the boundaries of the state, and may require reporting of emission information for each powered system.

In another embodiment, performances from a plurality of mobile vehicles of a fleet may be measured, and data responsive to the measured performances communicated to a central database. The received data may then be processed relative to a fleet performance requirement. The received data may be used to generate an operating instruction for operating the fleet in compliance with the performance requirement. The operating instructions may then be communicated to at least one mobile vehicle of the fleet. In one embodiment, the operating instruction may include a command to adjust a performance output, such as a power generated, a torque applied to an axle or a wheel, a speed, a braking effort, etc.

In another embodiment, an actual performance of each of several vehicles versus a corresponding performance requirement for each of the vehicles may be measured to calculate a difference between the actual performance and the corresponding performance requirement. The differences may then be summed over the fleet to determine fleet compliance with a fleet performance requirement. A plurality of performance requirements may be in effect for a respective plurality of geographic areas over which the fleet operates. Accordingly, the data may be processed relative to a respective performance requirement in effect for a geographic area in which a respective vehicle may be operating.

A consist will now be described with reference to FIGS. 4-7. The consist includes several powered systems, or vehicles, that travel together. A propulsion system controller 610 (PSC) represents hardware circuitry that includes and/or is connected with one or more processors (e.g., microprocessors, field programmable gate arrays, integrated circuits, or other electronic logic-based devices). A controller 610 may be disposed onboard each powered system and may respond to tractive-effort control signals generated in response to commands wirelessly communicated with powered system communication equipment 612 from a lead powered system 614 to a remote consist 616. By way of example, consist 616 may be shown to be made up of a remote powered system 620 and a trail powered system 622. It may be appreciated that the embodiment may be not limited to the consist arrangement shown, since many other consist arrangements may be provided depending on the specific train application. As may be described below, respective controllers on-board each powered system, such as distributed power controller (DPC) 624, primary powered system controller 626 (CAX), the PSC controller and the communication equipment may be configured with appropriate control algorithms to selectively limit the tractive effort provided by each powered system of a consist upon receiving a configuration input signal. Each of these controllers can include hardware circuitry that includes and/or is connected with one or more processors (e.g., microprocessors, field programmable gate arrays, integrated circuits, or other electronic logic-based devices).

Figure 6:
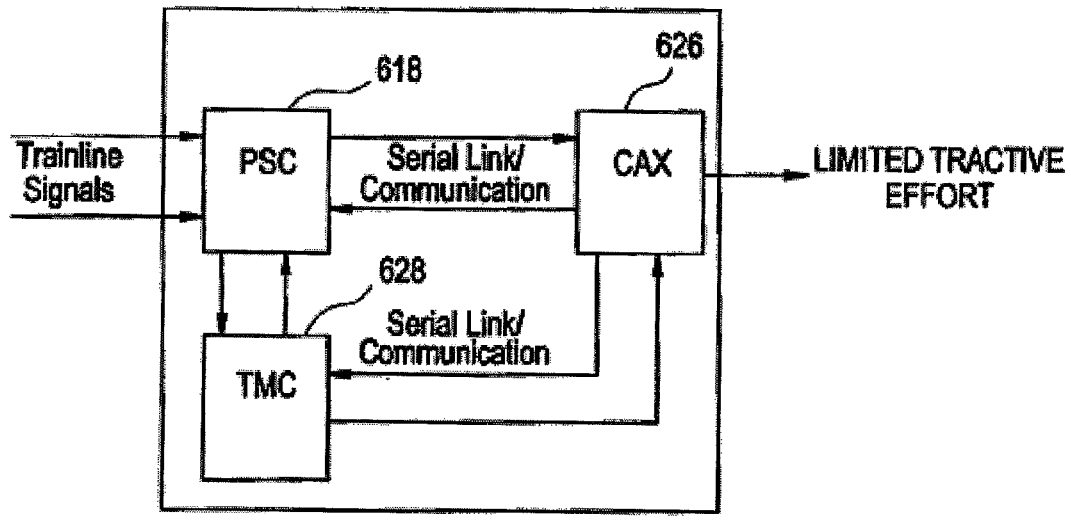
FIG. 6 is a block diagram of controllers providing selectable control of tractive effort for a fueled power generating unit.
Figure 5:
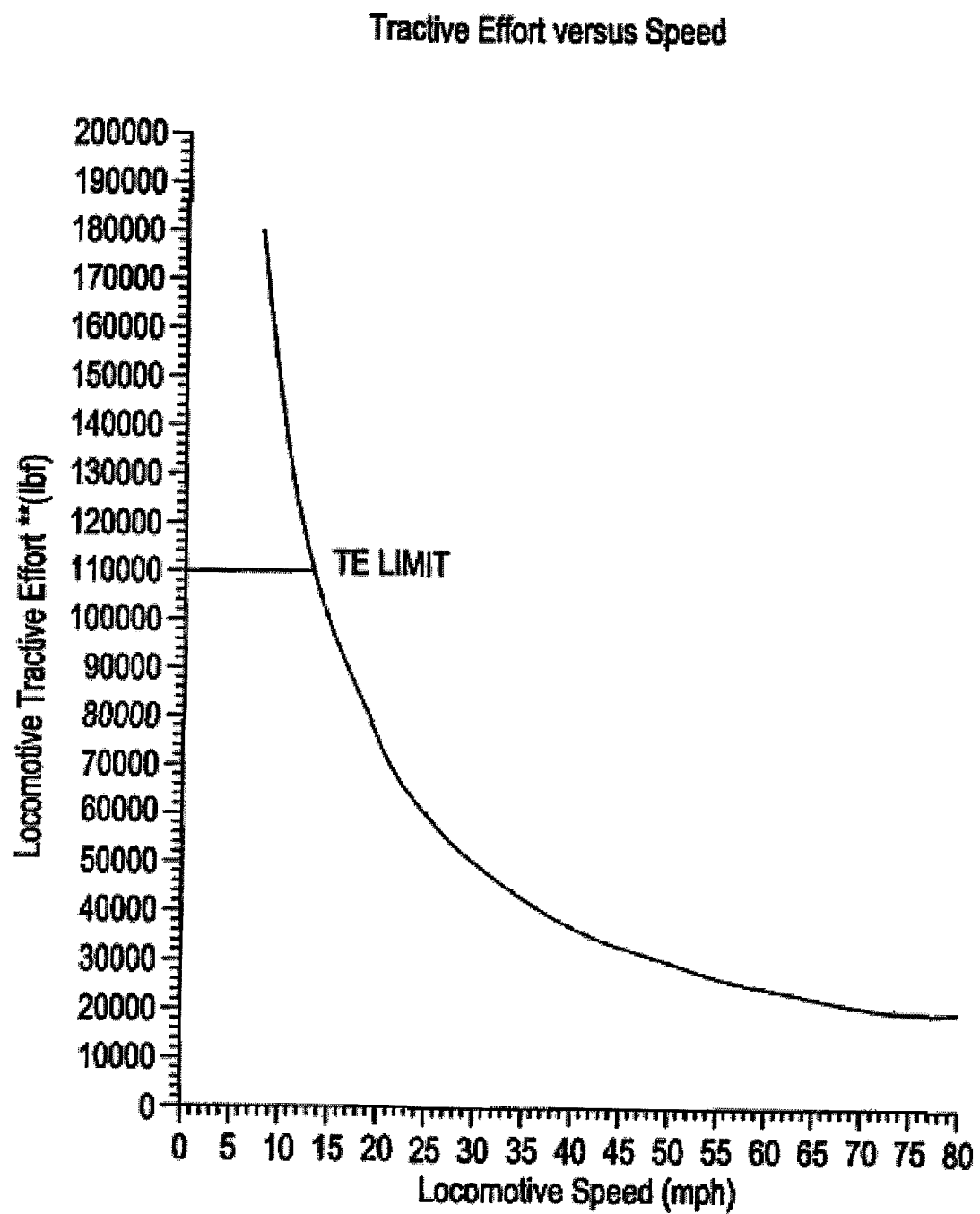
FIG. 5 is an example plot of tractive effort as a function of speed for a fueled power generating unit with selectably controllable tractive effort.

In one embodiment, upon receiving a configuration input signal, a powered system controller directs a pair of powered system train lines (such as lines T/L 618 and T/L 619) be energized (High) for limiting the total tractive effort of the powered system to a value lower than the powered system was originally designed to provide. As shown in FIG. 5 (which illustrates different tractive effort limitations as a function of speed of the powered system or consist), in one embodiment, the powered system may be selectively limited to approximately 110,000 pounds (approximately 4.99e+ 004 kilograms) of tractive effort for all six wheel-axles instead of the normal 180,000 pounds (8.165e+004 kilograms) of tractive effort. In the example embodiment, the communication equipment may be configured by way of the DPC controller onboard the remote powered system to energize the train lines to initiate the limited tractive effort (TE) mode of operation. In one embodiment, the PSC controller 610 would detect when both train lines may be active and interpret this condition as a command for limited tractive effort operation. A reduced tractive effort command would then be imposed on the respective traction motor controllers (TMC) 628, as illustrated in FIG. 6. Alternatively, the tractive effort of the lead powered system could be increased relative to the remote powered system so that a differential in tractive efforts may be developed between the lead and remote powered systems in a distributed power train. This differential helps keep unevenly loaded railroad cars in a train on the railroad path when the train encounters curvy and hilly path conditions.

In order for a remote powered system to reduce tractive effort, that powered system would initially determine whether it may be equipped (e.g., via hardware, software or both) to operate in a reduced tractive effort mode, and provide a signal to other powered systems that indicates that it may be equipped with selectable tractive effort capability. Similarly, a road number (or other identifier of different powered systems) may be selected from a pre-defined list of road numbers or other identifiers, indicating that the unit may be equipped with selectable tractive effort. In one embodiment, an appropriate controller may monitor both the road number of the powered system and/or the presence or absence of the signal of selective tractive effort capability to determine whether or not the powered system may be equipped to operate in a reduced tractive effort mode. At distributed power link time (e.g., the time period during which communication links between powered systems are established), the operator can select either the full tractive effort or reduced tractive effort mode. If the reduced tractive effort mode is selected, the distributed power unit onboard the lead powered system can issue a configuration input signal to instruct the remote DPC to operate in the reduced tractive effort mode. If the remote distributed power unit are configured for reduced tractive effort operations, the DPC controller 624 on-board the remote can then energize trainlines, such as trainlines 618 and 619 (two trainlines may be used for redundancy). In one embodiment, each powered system in the consist 616 can operate using reduced tractive effort when the powered system detects that either or both of these trainlines has been energized (e.g., the trainline receives the appropriate configuration input signal). Remote units (e.g., vehicles other than the lead vehicle) that may be equipped with the ability to operate in reduced tractive effort may default to this mode of operation for safety reasons. Remote units would return to normal levels of tractive effort responsive to detecting that both trainline 618 and trainline 619 are de-energized. For example, this could happen when the operator selects the full tractive effort mode of operation and the remotes receive the command from the lead unit to operate in full tractive effort mode and both trainlines 618 and 619 may be de-energized. Optionally, the commands issued from the lead vehicle to the remote vehicles to operate in a full tractive effort mode or a reduced tractive effort mode may be communicated in another manner, such as via one or more other wired connections, wirelessly, or the like.

In one embodiment, the powered system controller may restrict the tractive effort, and not necessarily the horsepower, delivered or generated by the powered system. This allows normal performance at higher vehicle speeds. As described above, two train lines may be used in order to provide a redundant, safe connection. Wireless communication techniques may be used to communicate the desired operational mode.

In operation, controlled tractive effort (CTE) selectively reduces tractive effort of powered systems that may be used as pushers or pullers, or both, in distributed power (DP) mode (e.g., an operational mode where a lead vehicle remotely controls operational settings of one or more, or all, remote vehicles). One or more powered systems configured with CTE capability may be placed at the rear of the consist and controlled by a lead powered system equipped with DP equipment (e.g., communication equipment such as transceivers and associated hardware). If two or more pushers are used (e.g., two or more remote vehicles are operating to push part of the consist), each of the pushing vehicles can be CTE-equipped and the controlling unit at the head end can be any DP-equipped unit. For example, assuming an AC4400CTE powered system may be used in a pusher application in DP mode, its tractive effort may be selectively reduced from 145,000 pounds (6.577e+004 kilograms) at 11 mph (17.7 kilometers/hour) to 110,000 pounds (approximately 4.99e+004 kilograms) at 11 mph (17.7 kilometers/hour). Users of fleets of powered systems may be able to mix and match the tractive effort of the powered systems to the actual needs of any given train without having to wait for an available powered system model capable of delivering the required tractive effort. Thus, the user would be able to use powered systems such as the ACT4400 CTE in multiple applications, including applications where a lesser rated powered system (from the point of view of tractive effort capability) would be used without having to wait for availability of the lesser rated powered system.

Figure 7:
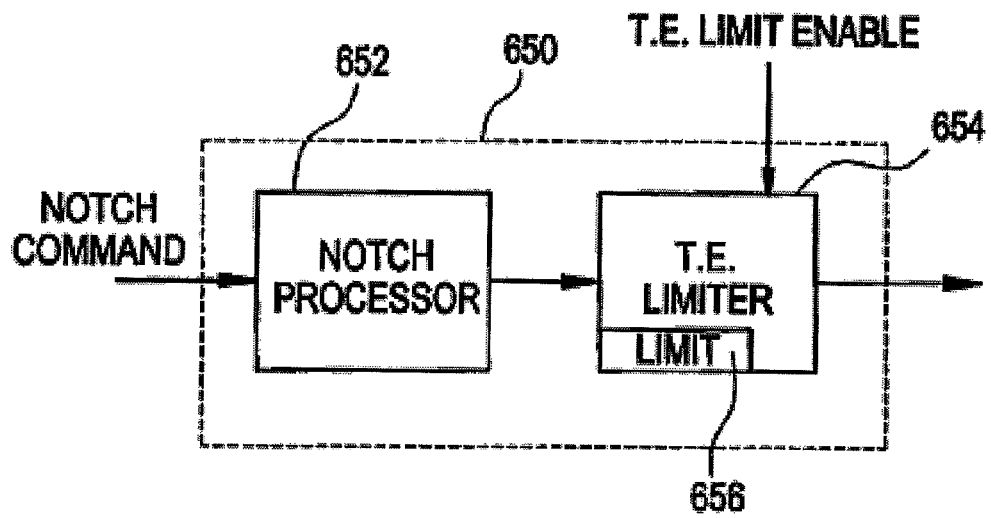
FIG. 7 is a block diagram of an example tractive effort processor.

As shown in FIG. 7, a tractive effort processor 650 includes a notch processor 652 configured to generate a tractive effort consistent with a respective notch command supplied to the processor 652. A tractive effort limiter 654 may limit the tractive effort using, for example, a tractive effort limit stored in a memory 656. The processors 650, 652 and limiter 654 can represent hardware circuitry that includes and/or is connected with one or more processors (e.g., microprocessors, field programmable gate arrays, integrated circuits, or other electronic logic-based devices).

In operation, upon activation of trainlines TL618 and TL619 (or receipt of control signals in another manner), the processor 650 limits a total tractive effort reference in each motoring notch to an amount desired for limited tractive effort operation. For example, the tractive effort produced at different throttle settings is limited to a designated amount associated with limited tractive effort operation. The tractive effort reference may then be appropriately distributed to each wheel axle based on the performance capability of each axle. Each axle and processor may have a closed loop mechanism that continuously processes feedback performance data, which may be then used to re-allocate the distribution of tractive effort to each axle to best achieve the reference value of tractive effort. The axle capability can represent the ability of an axle and wheel set to transfer power generated by an engine or motor to rotation of the axle and wheels. If axle capabilities degrade due to poor rail condition, thermal limitation, or horsepower limitations, the reference tractive effort may not be achieved even with optimal re-allocations of tractive effort to other axles. The operator may be informed of the limited tractive effort mode of operation by way of a summary message that may be displayed in a suitable display unit. The summary message may provide information indicative of whether or not tractive effort reduction may be enabled, such as "TE Limited: TE Reduction Enabled."

Figure 9:
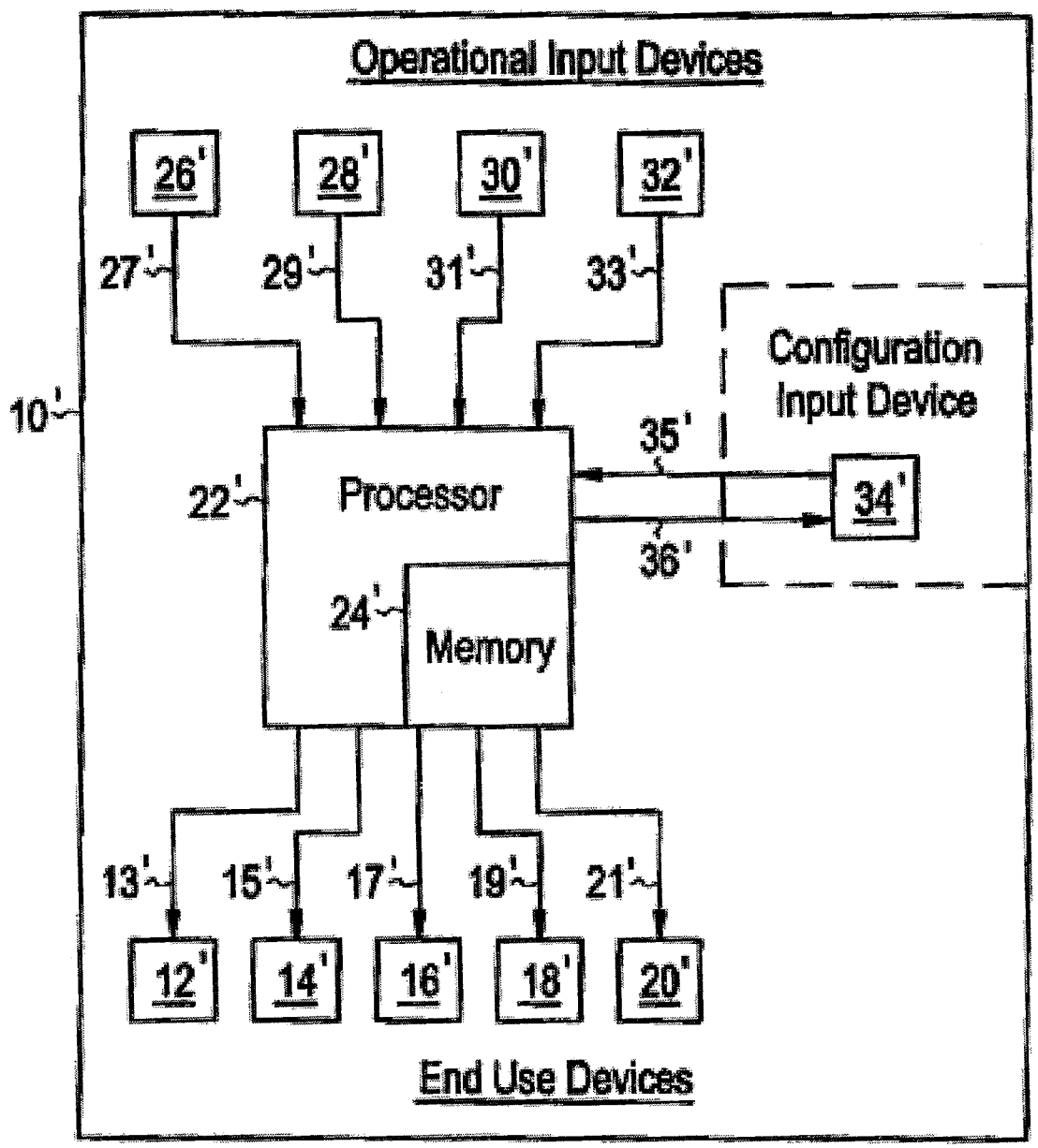
FIG. 9 is a block diagram of a powered system of a fueled power generating unit including a configuration input.

FIG. 9 illustrates one embodiment of a configurable powered system 10' to control engine performance of a fueled power generating unit. The powered system 10' can represent another embodiment of the powered system 10, 812 described above. The powered system includes a powered system engine operating on at least two fuel types. The powered system engine operates on each fuel type on one of an instantaneous or a duty cycle basis. For example, if the controller (discussed below) decides to operate on 80% of fuel A and 20% of fuel B, this may correspond to an instantaneous mixing of 80% of fuel A and 20% of fuel B based upon respective valve signals to respective fuel tanks holding fuel types A and B, or a duty cycle mixing, such as operating on fuel A for 80% of the time, while operating on fuel B for 20% of the time.

The powered system includes a controller 22', a plurality of powered system operational input devices 26', 28', 30', 32' including sensors 26', 28', 30' for respective fuel tanks 12', 14', 16' for each fuel type. The controller 22' can represent the controller 22, the input devices 26', 28', 30', 32' can represent interfaces, such as communication equipment (e.g., modems, routers, transceivers and associated circuitry, etc.), that communicate data that is output by the sensors 26', 28', 30' to the controller 22'. The sensors 26', 28', 30' can measure or otherwise sense characteristics of the fuel tanks 12', 14', 16', such as amounts of fuel in the different tanks, amounts of empty volumes in the different tanks, temperatures in the different tanks, chemical compositions of fuel in the different tanks, or the like. For example, the sensors 26', 28', 30' can represent radar sensors, temperature sensors, chemical sensors, or the like.

In one embodiment, each fuel tank may hold more than one fuel type at different times during operation of the powered system. During a first time period, a first fuel (e.g., liquid natural gas) may be in the tank while during a later, second time period, a different fuel (e.g., diesel fuel) may be in the same tank. The sensors may be used to identify characteristics of the fuel within the fuel tank in order to determine the fuel that is in the tank. The sensors may measure or sense characteristics that are used by the controller 22' and/or the input devices 26', 28', 30', 32' to identify a fuel type, fuel amount, or other characteristic within each fuel tank based in part on information provided to the powered system, including manual input, electronically transmitted fuel information from a fuel source, and the like.

The controller may include fuel type information for each location where filling of one or more tanks occurs. The sensors may further identify fuel properties of the fuel type within each tank. Such properties may include physical properties of each fuel type, including volume, temperature, pressure, viscosity and density, for example, or chemical properties of each fuel type, including energy content or purity. These properties of each fuel type may be detected by sensors or devices within the powered system. The sensors may measure the effect of a fuel on performance characteristics of the powered system, such as the powered system engine performance The controller may assess the input and output properties of each fuel type to the engine. For example, the controller may examine the tractive effort, speed, torque, or the like, that is generated during different time periods that the powered system consumes different fuels or different combinations of fuels. Based on changes to the tractive effort, speed, torque, or the like, the controller can identify the fuel or fuel combinations that cause the powered system to generate different tractive efforts, speeds, torques, or the like.

In one example, the engine of the powered system may select a configuration to produce 1000 horsepower (HP) for 2 hours. Based on previous examinations of the output properties of different fuels, the controller 22' can determine or estimate that the powered system can consume 200 gallons (757.1 liters) of a first fuel (fuel A) and 250 gallons (946.4 liters) of a different, second fuel (fuel B). That is, the controller may assess the fuel input and power output characteristics based on the powered system engine characteristics. A powered system including multiple fuels has greater flexibility in meeting a power demand than powered systems with a single fuel, as several combinations based on utilization of respective fuel types may be performed to meet a power demand. Adding an external domain, such as an emissions profile tied to a geographic location or a wear profile on the engine, can affect the balance of fuel use. The controller can, in response to a request for a particular external domain, switch from one configuration to another. Particularly, the controller can signal various valves, pumps and components to change the ratio and amount of fuel being supplied to the engine. The changed configuration allows the engine to operate within the newly indicated external domain.

As different restrictions are implemented or removed on operation of the powered system, the controller can change the fuels being consumed to power the system. For example, during travel in a first area having a first limit on the amount of emissions that can be generated by the powered system, the controller may cause the powered system to consume a first fuel (that prevents the powered system from generating more emissions than the first limit. During exit of the powered system from the first area, the first limit on the amount of emissions may no longer apply. As a result, the controller may cause the powered system to consume a different, second fuel or a combination of the first fuel and the second fuel (which may cause the powered system to generate more emissions than the first limit). During approach or entry of the powered system into a section of a route having a significant uphill grade, the controller may cause the powered system to consume a different, third fuel or a combination of the first, second, and/or third fuel. The different fuel or fuel combination can cause the powered system to produce increased power during travel up the grade. Upon completing travel up the grade, the controller can cause the powered system to return to consuming another fuel or fuel combination.

Although FIG. 9 illustrates one type of sensor, such as sensors receiving electronically transmitted information from fill-up stations, for example, any sensors discussed above may be utilized in the powered system. The operational input devices may couple with the controller to generate operational input signals 27', 29', 31', 33' to the controller.

Suitable components 12', 14', 16', 18', 20' include a fuel tank for each respective fuel type carried on the powered system. Although FIG. 9 illustrates three fuel tanks for two respective fuel types and one fuel type-mix, such as E-80, for example, any number of fuel tanks and respective fuel types may be utilized. Each component may be activated by the controller to subsequently affect the engine operation to correspond to an engine operating profile, as discussed below.

Figure 12:
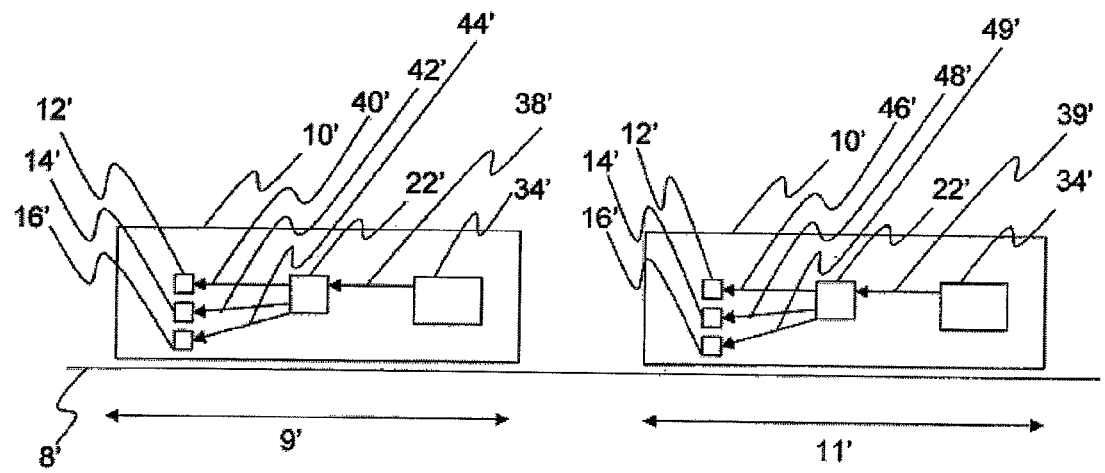
FIG. 12 is an illustration of operating a fueled power generating unit as a function of the location of the fueled power generating unit according to one embodiment.

As illustrated in FIG. 9, a configuration input device 34' may be coupled with the controller to generate a respective configuration signal 35' indicative of each particular external domain 9', 11' (FIG. 12). The configuration signals differ from the operational signals transmitted to the controller. The configuration signals can represent the mode or restrictions that the powered system is to operate according to or within. For example, responsive to the powered system entering into or coming within a designated distance (e.g., 10 km, 5 km, 1 km, etc.) of entering an area having an upper limit on the amount of emissions that can be generated during travel within that area, a configuration signal may be generated that represents the upper emissions limit or that indicates an operational mode that the powered system is to operate according to (and which limits the generation of emissions to a level that is within or less than the limit).

Alternatively, as illustrated in FIG. 9, one or more remote processors 37' in wireless communication with the controller may transmit mission information for the fueled power generating unit to the processor. The mission information may include respective configuration signals 35' for each particular external domain 9', 11' applied to the fueled power generating unit. Upon transmission, the mission information may be stored in a memory 41' of the controller.

In one embodiment, where the external domain is a geographic location, at each particular location of the fueled power generating unit along the predetermined course, the processor may respond to the operational input devices, and a respective configuration signal from the internal memory for each particular location, to generate at least one set of control signals to the components to control the engine operation based on the use of each fuel type associated with a respective stored engine operating profile. These control signals may be generated to cause or prevent the system from consuming certain fuels in certain areas due to geographic restrictions or requirements on what fuels can be consumed in the various areas, due to geographic restrictions or requirements on how much emissions can be generated in the various areas, due to changes in grade of the route that may require increased tractive effort or horsepower to travel along (and thereby needing different fuel to provide the increased effort or power), etc.

Additionally, the controller memory may store health status information of the engine and duration since the most recent engine service. The plurality of operational input devices may communicate an engine wear factor associated with each respective fuel type to the controller, and the processor may generate a plurality of control signals to the components to maintain a minimum health status of the engine based upon the engine wear factor of each respective fuel type. The calculated cost of each fuel type may depend in part on its respective engine wear factor. For example, if the health status information reveals a health status below a minimum threshold, the controller may generate a set of control signals to utilize those fuel types having the lower engine wear factor.

As illustrated in FIG. 9, the configurable powered system includes a memory 24' coupled with the controller to store a respective engine operating profile for each configuration signal 35' indicative of each particular external domain 9', 11' (FIG. 12), such as a powered system being at a particular point on a selected path 8'. The controller may respond to the operational input signals, configuration signals 35', and the memory to generate a set of control signals 13', 15', 17', 19' ,21' to the end-user devices for controlling engine operation based on the fuel types, and the stored engine operating profile for each configuration signal indicative of each particular external domain. For example, different engine operating profiles may be associated with different configuration signals such that, responsive to a different configuration signal being generated or received, the operating mode of the powered system changes based on a change in the engine operating profile. The engine operating profile can dictate or designate the fuel or combination of fuels that are to be used during operation according to the operating mode.

In an embodiment, the set of control signals may adjust a total fuel efficiency of the powered system based on the fuel types available to the powered system, a stored engine efficiency profile, a total output power of the engine to a stored output power profile, and/or a time of arrival for the fueled power generating unit along the predetermined course to a time of arrival restriction for each configuration signal indicative of each particular location of the fueled power generating unit along the predetermined course. The stored engine efficiency profile can represent how much of one or more fuels is consumed as a function of the power, speed, tractive effort, etc., of the powered system. The output power profile can represent how much power or tractive effort is generated by the engine of the powered system as a function of different fuels being consumed by the engine, different combinations of the fuels being consumed by the engine, different amounts of the fuels being consumed by the engine, etc. The time of arrival for the fueled power generating unit along the predetermined course to the time of arrival restriction can represent a comparison or difference between an estimated time that the vehicle or vehicle consist is to arrive at a location and an expected time that the vehicle or vehicle consist is to arrive at the same location. For example, if the vehicle or vehicle consist is traveling behind schedule, then this comparison can indicate that the vehicle or vehicle is to arrive at the location after a scheduled time but, if the vehicle or vehicle consist is traveling ahead of schedule or on schedule, then this comparison can indicate that the vehicle or vehicle consist is to arrive at the location ahead of or at the scheduled time. In one embodiment, optimizing total fuel efficiency may be performed while maintaining the engine performance (emission, horsepower, or other characteristic) at a constant level.

Upon the plurality of components receiving the set of control signals to limit the total engine emissions of all fuel types, a respective input device 43' (such as a lever or other device) positioned proximate to each of the components may be used to control the flow of each respective fuel type to the engine in optimizing the total engine performance based on a respective stored engine operating profile.

The total engine emissions of all fuel types may be a weighted sum, with weighted coefficients, for each respective engine emission of each respective fuel type. For example, the total emissions may be represented as a sum of a first product between a first weighted coefficient and a first amount of engine emissions associated with a first fuel type, a second product between a second weighted coefficient and a second amount of engine emissions associated with a second fuel type, and so on. The controller can generate each set of control signals based upon the weighted coefficients or the weighted sum. For example, for fuels associated with larger weighted coefficients, the controller may generate a control signal that directs more of those fuels relative to other fuels associated with smaller weighted coefficients.

The weighted coefficients for each respective fuel type may be based upon each respective stored engine operating profile for each particular external domain 9', 11', the individual engine output associated with the use and ratio of multiple fuel type, and/or the operational input signals indicative of the availability of each fuel type, such that the total engine emissions may be limited to the stored engine operating profile for each configuration signal and particular location of the fueled power generating unit (e.g., the powered system). For example, for an operating profile that restricts how much of a first fuel is consumed in a designated area (e.g., by limiting how much emissions are generated by the powered system), the weighted coefficient for the first fuel may be smaller than the weighted coefficient for another type of fuel (that is not restricted by the operating profile, such as due to the other type of fuel generating fewer or no emissions). The weighted coefficients for different fuels may change over time and/or during a trip of the powered system due to changes in the amount of fuel carried by the powered system. For example, a weighted coefficient for a fuel may increase when the amount of fuel carried by the powered system is increased (e.g., following refueling of the powered system) but can decrease as the fuel is consumed by the powered system. In one embodiment, if the operational input signals reveal a fuel shortage for fuel B, the weighted coefficients for fuel types A and B may become 95/5, so to conserve fuel type B. For example, the weighted coefficients can change by reducing a coefficient associated with a fuel in order to reduce the amount of that fuel that is consumed by the powered system. The weighted coefficient for such a fuel can be reduced even if the amount of fuel does not decrease so that the fuel is conserved and less fuel is consumed. In one embodiment, if the powered system left one region and enters a region associated with a different stored engine profile, the weighted coefficients for fuel types A and B may change from 50/50 to 20/80 (or other values), based upon the larger individual operating profile for fuel type B, as the increased engine operating profile permits an increased total engine emission output through increasing the weighted coefficient for fuel type B.

The weighted coefficients of each fuel type may be changed by computing a time integrated ratio of the respective engine emission output, fuel efficiency, engine performance, and the like, based at least in part on the contribution of each fuel type, and switching between fuel type amounts based on the computed time integrated ratio. For example, in the previously discussed embodiment of a powered system, in which the weighted coefficients for fuels types A and B changed from 50/50 to 80/20, the weighted coefficient for fuel type A could be increased and the weighted coefficient for fuel type B could be decreased based upon the computed time integrated ratio of fuel types A and B over the powered system trip. By computing the time integrated ratio of the respective engine emissions (or fuel efficiency) over the powered system trip, this allows on-board diagnostics to monitor the respective engine operations for differing fuel ratios, to obtain early warning of any engine degradation, and to update the status of each trip to comply with the goals and intent of each mission.

Figure 11:
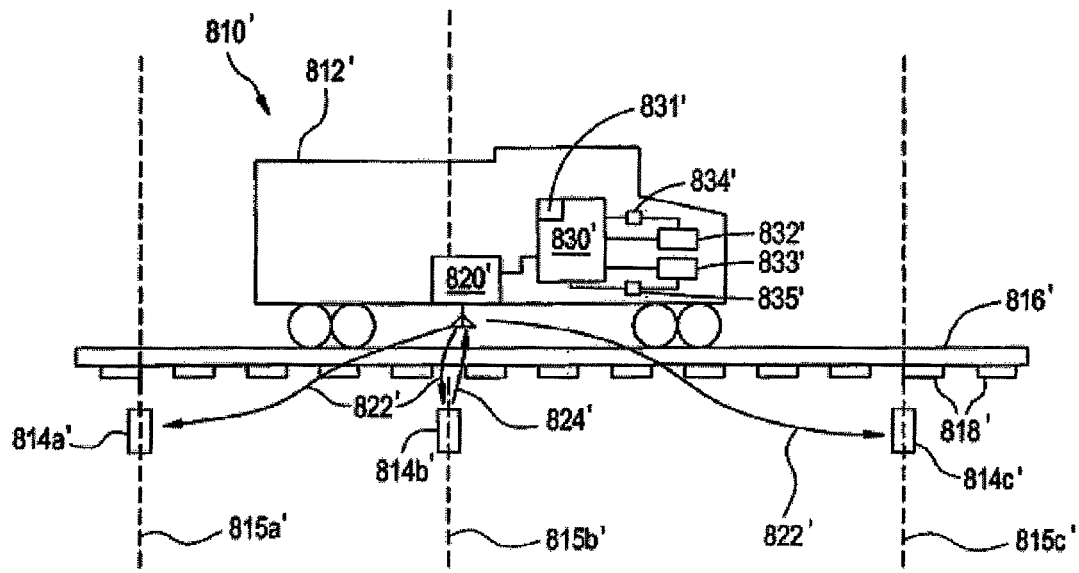
FIG. 11 is an illustration of operating a fueled power generating unit as a function of the location of the fueled power generating unit according to one embodiment.

The configuration input device may be a position determining device. In one embodiment, the configuration input device may include an automatic device such as a GPS (Global Positioning System) device and a wayside device, such as a transponder device, as illustrated in FIG. 11. One embodiment of such a transponder includes a beacon (e.g., a balise). Additionally, wayside devices include equipment positioned adjacent to the railroad or route being traveled by a powered system, such as an axle counter or hotbox detector, for example. In one embodiment, a hotbox detector detects the number of heated axles passing by the hotbox detector, and the transponder transmits a signal with the accompanying mile marker location of the hotbox detector and the number of heated axles passing by the detector to the controller 22', thereby conveying position information. Each powered system communicates the position information received by an onboard controller of that powered system with an approximate or measured current position (e.g., as determined by an onboard device, such as a GPS receiver) to determine if the position information received from the wayside equipment pertains to that specific powered system. For example, if a fueled power generating system is traveling from Jacksonville to Miami, the system should receive position information consistent with the route being traveled by the system and the current time of travel along the route, such as a mile marker proximate to Daytona Beach after forty minutes of travel. Additionally, the position determining device onboard the powered system may include an axle speed sensor, in which the controller can integrate the axle speed received from the axle speed sensor over the time duration of the mission to determine the current position of the powered system. Additionally, the position determining device may include a wireless system including a radio transmitter or differential transmitter including operating specifications conforming to IEEE 802.11b (e.g., Wifi), for determining the cellular area or yard area location of the powered system. Other such wireless systems for the position determining device include a leaky coax, a slotted waveguide, and Doppler radar, or any other wireless system. Additionally, an imaging device, such as a camera, may perform image recognition of an upcoming mile marker or known landmark stored in the fueled power generating unit processor, for determining the location of the unit. Additionally, the position determining device may include the operator of the powered system manually recognizing an upcoming mile marker or landmark along the predetermined course.

FIG. 11 shows a system 810' for controlling a powered system operating condition, such as an emission parameter, in response to information encoded in transponders 814a', 814b', 814c' positioned along the path. For example, the transponders may be positioned at predetermined boundaries to identify when a powered system passes a boundary (and enters into or exits out of an area defined by the boundary). Transponders and may be positioned in the bed of the path or in other locations. The powered system may be equipped with a transponder reader to read the information encoded in each transponder that powered system passes while traveling along the path. While the following describes one reader located on the powered system, it should be understood that the reader may be installed on any car or powered system. In some instances, the powered system operates without an attached car or another powered system. The reader may provide control information read from a transponder to a controlling powered system or to a remote operator.

In one embodiment, the reader may radiate a radio frequency (RF) activation signal 822' that may be received by the transponder 814b'. The activation signal 822' provides sufficient energy to the transponder 814b' to allow the transponder 814b' to radiate a transponder signal 824' back to the reader. The transponder signal 824' may be an RF signal having a frequency different than that of the activation signal 822'. The transponder may also be powered by another suitable source of power, such as batteries, solar power, or a line to a power source. The reader should be located within a suitable detection distance from the transponder to receive the transponder signal 824'. Accordingly, transponders may need to be spaced at distances greater than such detection distance to prevent interference among transponders. Unique identifiers for the communication of each transponder with the reader may also be used to allow for closer spacing of transponders.

The reader may communicate with an onboard control system 830', such as a powered system control unit (LCU) that controls the powered system, which may include or represent the controller 22'. After reading a transponder, the reader provides the control information encoded in the transponder signal 824' to the onboard control system to control the operating parameters of the powered system. For example, the reader may provide location determination information to a memory 831' within the onboard control system (e.g., the controller). The controller may use the location information to retrieve an engine operating profile from the memory for that particular location, for example. The onboard control system may send control signals (including valve signals) to at least one fuel tank 832', 833' holding a respective fuel type among a plurality of types of fuel. These signals may control how much of the different fuels are supplied to the engine of the powered system. As described herein, the control signals may change over time to alter which single fuel is supplied to the engine, what combination of two or more fuels are concurrently or simultaneously supplied to the engine, and/or the amounts of the two or more fuels that are concurrently or simultaneously supplied to the engine.

In one embodiment, sensors 834', 835' may be used to identify a fuel type and/or a fuel level in a respective fuel tank. These sensors may measure characteristics of the fuel in one or more of the tanks and communicate the measured characteristics to the controller or another processor. Based on the measured characteristic or characteristics, the controller can determine the type of fuel and/or amount of the fuel in one or more tanks. The characteristics that are measured can include viscosity, density, temperature, relative amounts of the fuel in different states in the same tank (e.g., an amount of fuel in a gaseous state and an amount of the fuel in a liquid or solid state in the same tank, which can represent how much the fuel effervesces or evaporates), color, weight, etc.

The controller may retrieve operating characteristic information for the powered system from the memory at various locations. This information can include mileage limits (e.g., how far the powered system is limited to moving within a designated time period), engine horsepower output, and/or other such associated considerations. The powered system may maintain these same operating parameters until passing another transponder 814c', where new control information may be received. The control information received from each transponder may be provided to the onboard control system for automatic control.

In an aspect, two or more sequentially positioned transponders may be configured to provide control information dependent on the direction of powered system travel with respect to the transponders. For example, transponder 814a' may comprise a pair of transponders positioned at the boundary 815a' to provide control information to control the operating parameters of the powered system depending on a direction of travel along the route (e.g., a rail or track), such as if the powered system may be entering or leaving an area 817' bounded by the boundary line 815'. A boundary may be, for example, a state line between adjacent states of a country, which may require different operating profiles. As the powered system detects leaving one state and entering an adjacent state, the powered system may be instructed to change an operating parameter (such as an emission parameter) corresponding to the requirements of the state it has just entered. In one aspect, the reader may be mounted on a coupled, different powered system—this includes mechanically coupled states, as well as a plurality of automated vehicles operating in a coordinated manner. The different powered system detects its location and transmits the location information to the powered system for controlling operation of the powered system responsive to the location information provided by the different powered system.

The configuration input device can include an automatic position determining device, such as a GPS device and/or transponder discussed above, or a manual device featuring an operator panel for manually inputting a particular configuration signal 35' upon the powered system entering a particular region.

Figure 10:
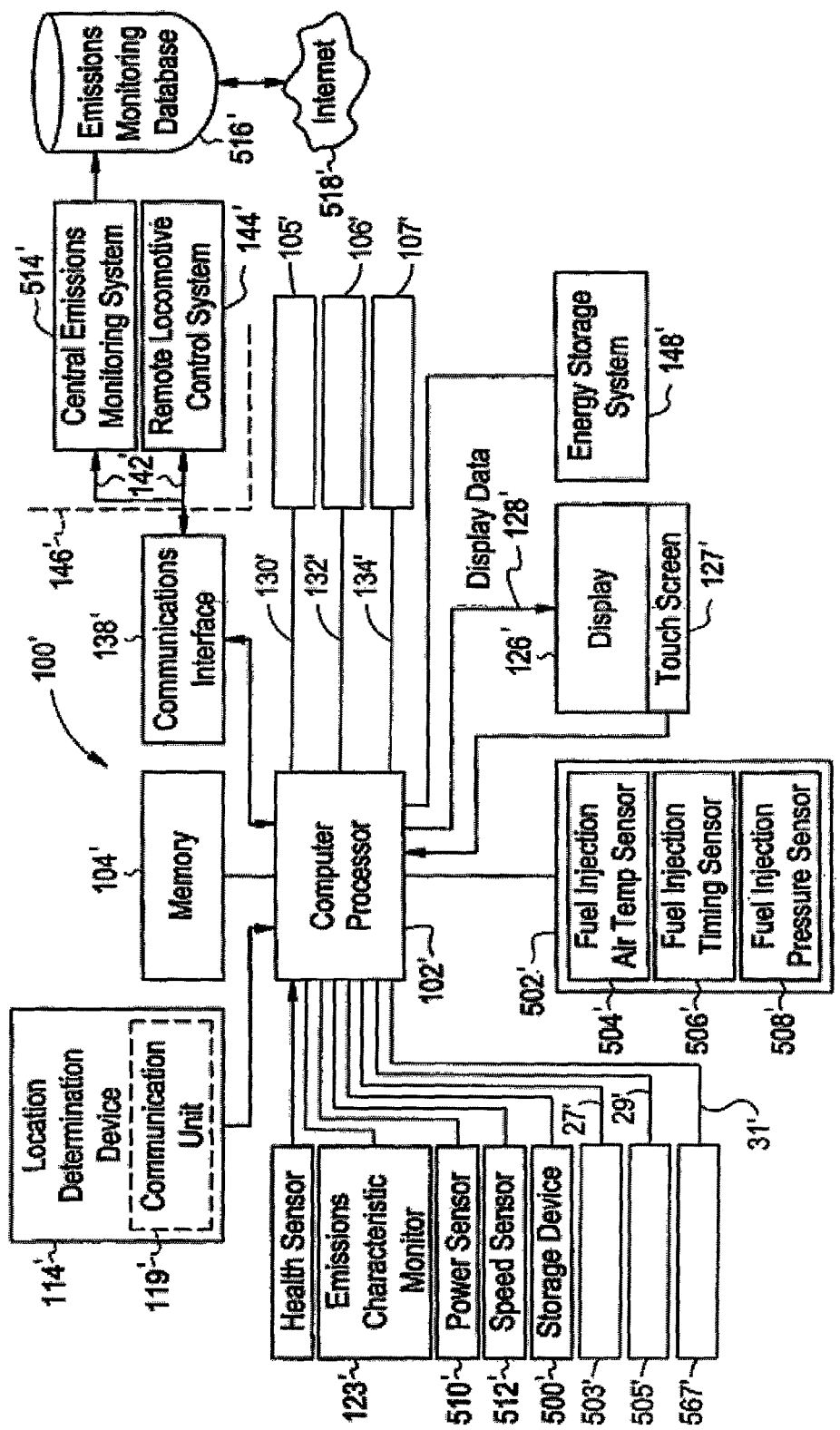
FIG. 10 is a block diagram of a powered system in accordance with one embodiment.

As illustrated in FIG. 10, a powered system further includes an emission parameter monitor 502' coupled to a controller with one or more processors 102' for monitoring operating parameters of the powered system indicative of the total engine operation while using multiple fuel types. The processors 102' can represent hardware circuitry that includes and/or is connected with one or more processors, such as microprocessors, field programmable gate arrays, integrated circuits, or other electronic logic-based devices. In one aspect, the controller with the one or more processors 102' can represent one or more of the controllers 22, 22' described herein.

In response to receiving the parameter values from the emission parameter monitor, the processors 102' send secondary control signals 130', 132', 134' to the components 105', 106', 107' to control the engine. The processors 102' may create or reference a stored engine profile for each configuration signal 35'. As illustrated in FIG. 10, the operational input signals 27', 29', 31' from sensors 503', 505', 507' include flowrate signals indicative of the fuel volume of one or more fuel type remaining in its respective fuel tank 105', 106', 107'.

For stationary applications, upon commissioning equipment including a configurable powered system the configuration input device may generate a configuration signal 35' indicative of a set of operating conditions for the equipment. The operating conditions or engine operating profile may be a determine set and may be based at least in part on such factors as time of day, day of week, season of year, condition of connected utility grid, ambient conditions, manually identified conditions, and the like.

As illustrated in FIG. 12, the fueled power generating unit switches between a first operating condition associated with a first external domain 9' and a second condition associated with a second external domain 11' from among a spectrum of possible operating conditions. In response to the first external domain 9', the controller may respond with a first configuration signal 38' from the configuration input device to generate a first set of control signals 40', 42', 44' including a first set of valve signals to each respective fuel tank to control the ratio and/or amount of fuel from each of the fuel types based at least in part on a first stored engine operating profile. In response to the second external domain 11', the controller may respond to a second configuration signal 39' from the configuration input device to generate a second set of control signals 46', 48', 49' including a second set of valve signals to each respective fuel tank to control the ratio and amount of fuel from each of the fuel types based at least in part on a second stored engine operating profile.

Suitable external domains can include geographical location, emissions, ambient conditions, operational demands, fuel external availability, on-board fuel supplies, equipment health status, mission criticality, fuel characteristics, and the like. For geographic location, such information can be derived from a positioning system (e.g., a global position system or GPS) from a wayside device, an inertial guidance system, or the like. Emissions can be based at least in part on regulations and geographic location, but may also be based on ambient conditions and engine exhaust characteristics (e.g., NOx levels, PM levels, CO levels, and the like). Ambient conditions can include barometric pressure, air temperature, smog or ozone levels, weather conditions, and the like. Operational demands can include a need for the powered system to be in a certain place at a certain time, which can then be used to calculate the distance from a current location and a needed speed of travel to meet the parameters set forth. Fuel external availability can include the re-supply availability on an upcoming selected path. On-board fuel supplies includes the amount of each fuel available on the powered system. The amount can be calculated in volume, in energy content, in terms of hours of availability, and the like. In one embodiment, on-board energy storage devices count as fuel with the state-of-charge being the equivalent amount of fuel. Equipment health status can include measured performance, estimated performance, and a combination of the two performance values. Measured performance can include values supplied by sensors (not shown) that express, for example, fuel system status, such as the wear on fuel injectors or the available flow rate of natural gas from a fuel tender. Estimated performance can be calculated from a known age of a component, or a known use profile, as referenced against, for example, a look up table or map. Mission criticality can include input from an operations center, and can be based at least in part on the path that powered system is anticipated to travel during operation or on the type of goods intended to be transported by the powered system. If the path is through a remote, inaccessible area that would make repair difficult or would have a high cost for failure, then that would be a relatively high level of criticality compared to a mission with a path that was easily accessible for a repair in the event of a failure. Likewise, goods that are perishable or would be adversely affected by delay would have higher criticality than goods that would not be so affected.

Fuel characteristics can include the operational effects, relative energy content and/or purity of the various fuels being used. Natural gas and like bio-gases (methane, propane, butane, etc.), gasoline, ethanol (and other alcohols), hydrogen, bio-diesel, kerosene and other terpenes, and diesel all have inherently different characteristics, and their combination at different ratios provides correspondingly different engine operation profiles. For example, one fuel type might be relatively easy on an engine compared to another fuel type. So, to reduce engine wear or to reduce the chance of an engine failure one might weight the use of the fuel type that is easier on the engine when the mission criticality increases. Similarly, for dual fuel usage (gasoline with ethanol content, or diesel with natural gas) the ratio of one fuel to the other may be taken into account at an external domain to select an operating condition for the engine.

FIG. 10 illustrates one embodiment of a configurable powered system 100' for controlling operating characteristics of a fueled power generating unit. The fueled power generating unit includes an engine operating on at least two fuel types. Although FIGS. 9-12 illustrate a particular implementation of a configurable powered system as a rail vehicle, the configurable powered system may be applied to other systems, such as marine vessels and mining vehicles.

The system communicates with a plurality of operational input devices 503', 505', 507' (e.g., such as sensors) for a respective fuel tank 105', 106', 107' for each fuel type. The operational input devices may include flowrate sensors to measure the rate at which each respective fuel type flows into and/or out of the respective tank, and communicate this information to the controller in the form of operational input signals 27', 29', 31'. The input devices optionally may measure the remaining volume of fuel in each respective fuel tank and communicate the measured volumes. Additionally, the operational input devices may include sensors for identifying characteristics of the fuel type within each fuel tank. Each operational input device may communicate with the controller for generating operational input signals 27', 29', 31'.

The system may include a plurality of components, including respective fuel tanks and tenders for each respective fuel type. The flow of fuel from each respective fuel tank may be controlled by the controller. The system may include a configuration input device 114' to generate a respective configuration signal 115' indicative of each external domain 9', 11' (FIG. 12). The configuration signal 115' may differ from the operational signals 27', 29', 31' transmitted from the operational input devices to the controller.

In accordance with the schematic shown in FIG. 10, the system includes a memory 104' coupled with the one or more processors in the controller, which can store a respective operating characteristic profile for each configuration signal 115' indicative of the external domain 9', 11'.

The controller may respond to the operational input signals, configuration signals, and external domain information stored in memory to generate at least one set of control signals to the components including each respective fuel tank to control the engine operating characteristics. The operating characteristics include fuel use rates for the various fuel types, engine power output, or other operating characteristic.

The system may include a parameter monitor 502' coupled to the controller to monitor values of an operating characteristic parameter of the powered system. Based on values of an operating characteristic parameter from the parameter monitor, the controller may send secondary control signals to the components to control operation of the engine. For example, if after sending the set of initial control signals to each fuel tank for each respective fuel type, the operating characteristics of the engine do not meet the desired characteristics (e.g., the emissions being generated by the engine are greater than a designated amount or generation rate, the power generated by the engine is less than a designated power, etc.), the secondary control signals may be initiated as a feedback loop to adjust the fuel flow rates for each of the fuel types until such engine operating characteristics are in a determined range of operating characteristics.

The operating characteristics of one or more fuel types may include sound emissions (e.g., a level of audible noise generated by the engine). A first configuration signal may be initiated upon the powered system entering or exiting a first area associated with a lower audible noise limitation. The controller can generate and communicate a first set of control signals 40', 42', 44' to the components to limit the total sound emissions to a first stored sound operating profile within the memory for the first area. Additionally, a second configuration signal 39' may be initiated when the powered system leaves the first area and enters a different, second area associated with a larger audible noise limitation. The controller can generate a second set of control signals 46', 48', 49' to the components to limit the total sound emissions to a second stored sound operating profile within the memory for the second area 11'. For a marine vessel, the operating characteristics of one or more fuel types may include sound emissions. A first configuration signal may be initiated upon the marine vessel entering a port area, where the controller generates a first set of control signals 40', 42', 44' to the components to limit the total sound emissions to a first stored sound operating profile within the memory for the port area. Additionally, a second configuration signal 39' may be initiated when the marine vessel leaves the port area and enters a non-port area, where the controller generates a second set of control signals 46', 48', 49' to the components to limit the total sound emissions to a second stored sound operating profile within the memory for the non-port area 11'. The second stored sound operating profile may be greater than the first stored sound operating profile, as the permissible sound operating profile in a non-port area for a marine vessel may be larger than in a port area, for example.

Figure 13:
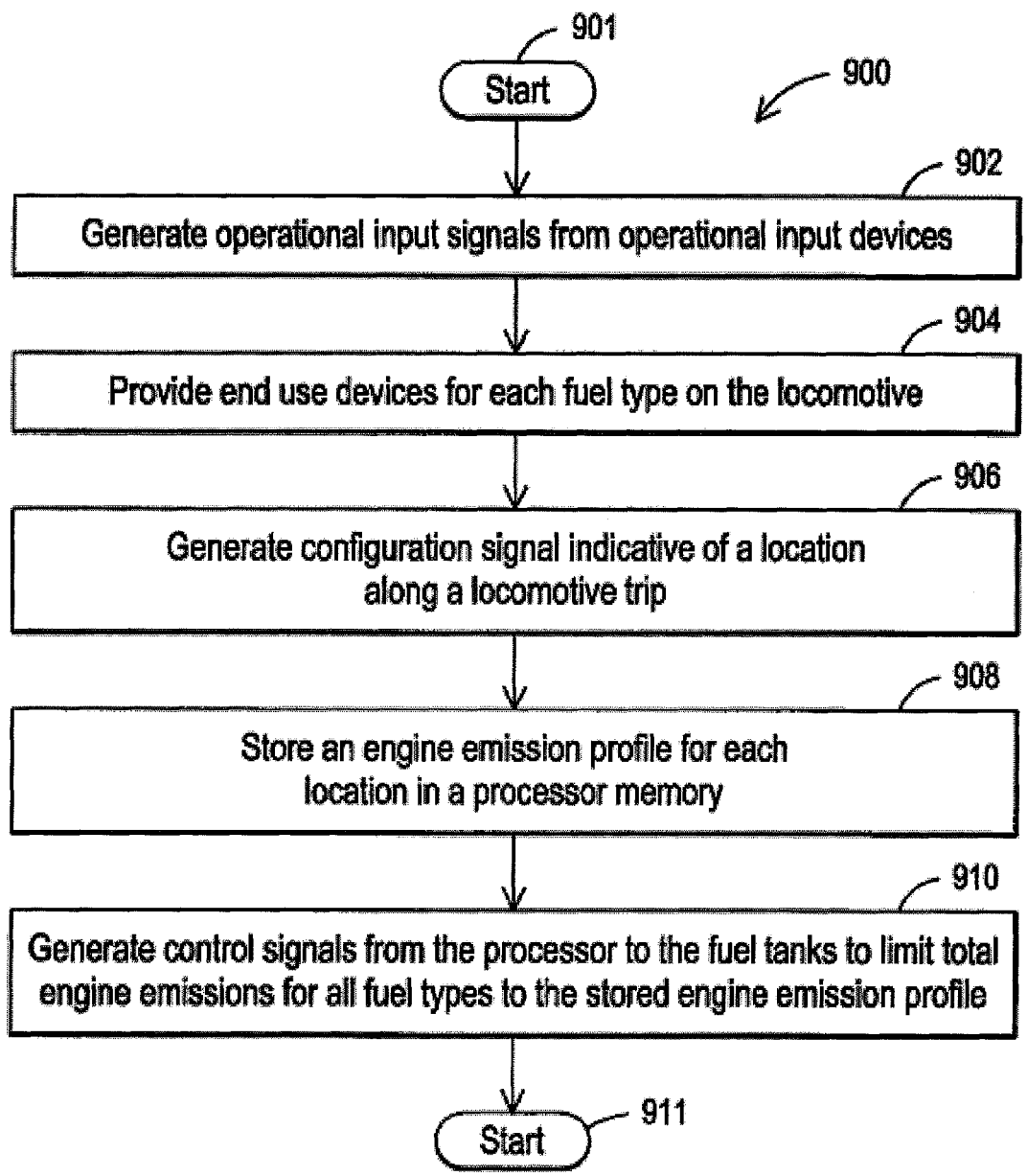
FIG. 13 is a flow chart illustrating an example method of operating the system illustrated in FIG. 9.

A method 900 embodiment for configuring a fueled power generating unit, such as a powered system to control engine performance, is illustrated in FIG. 13. The powered system includes a powered system engine operating on multiple fuel types. The powered system engine uses the fuel types based on at least one of an instantaneous or a duty cycle basis. For example, if a controller decides to operate with a weighted basis of 80% on fuel A and 20% on fuel B, this may correspond to an pre-mixing of 80% of fuel A and 20% of fuel B based upon respective valve signals to respective fuel tanks holding fuel types A and B, or it may correspond to a duty cycle mixing, such as operating on fuel A for 80% of the time, while operating on fuel B for 20% of the time, for example.

FIG. 13 illustrates one embodiment of a method 900 for controlling operating characteristics of a fueled power generating unit. Although one or more embodiments may be described with respect to rail vehicles, specifically trains and powered systems having diesel engines, embodiments of the inventive subject matter described herein also may be applicable for other uses, such as but not limited to mining vehicles, marine vessels, and stationary units. Toward this end, when discussing a specified mission, the mission can include a task or requirement to be performed by the powered system or unit. Therefore, with respect to railway, marine or off-highway vehicle applications this may refer to the movement of the system from a present location to a destination. In the case of stationary applications, such as but not limited to a stationary power generating station or network of power generating stations, a specified mission may refer to an amount of wattage (e.g., MW/hr) or torque to be satisfied. Likewise, operating condition of the fueled power generating unit may include one or more of speed, load, fueling value, timing, etc.

The method begins (block 901) by generating (block 902) operational input signals from a plurality of powered system operational input devices including sensors 26', 28', 30' for a respective fuel tank for each fuel type to a controller on the powered system. The method 900 subsequently involves providing (block 904) a plurality of components including fuel tanks for each respective fuel type on the powered system controlled by the controller to control the engine emissions to correspond to at least one stored engine operating profile.

The method 900 further illustratively includes generating (block 906) a respective configuration signal 35' from a configuration input device in communication with the controller, where each configuration signal may be indicative of a particular external domain 9', 11' (FIG. 12). The method includes storing (block 908) a respective engine operating profile for each configuration signal 35' indicative of the particular external domain 9', 11' (FIG. 12).

The method includes generating (block 910) a set of control signals from the controller to the components to control the engine output for of all fuel ratios according to the stored engine operating profile for each configuration signal 35' indicative of each particular need 9', 11' of the powered system along the path 8', before the method optionally ends at block 911. The total engine emissions of all fuel types may be a weighted sum having weighted coefficients for respective engine emission of each respective fuel type.

More particularly, generating (block 910) a set of control signals can include determining the weighted coefficients of each respective engine emission of each respective fuel type. The weighted coefficients for each respective fuel type may be based upon each respective engine operating profile at each particular location, the individual engine emission of each respective fuel and the operational input signals indicative of the availability of each fuel type, such that the total engine emissions may be limited to the stored engine operating profile for each configuration signal and particular location.

Figure 14:
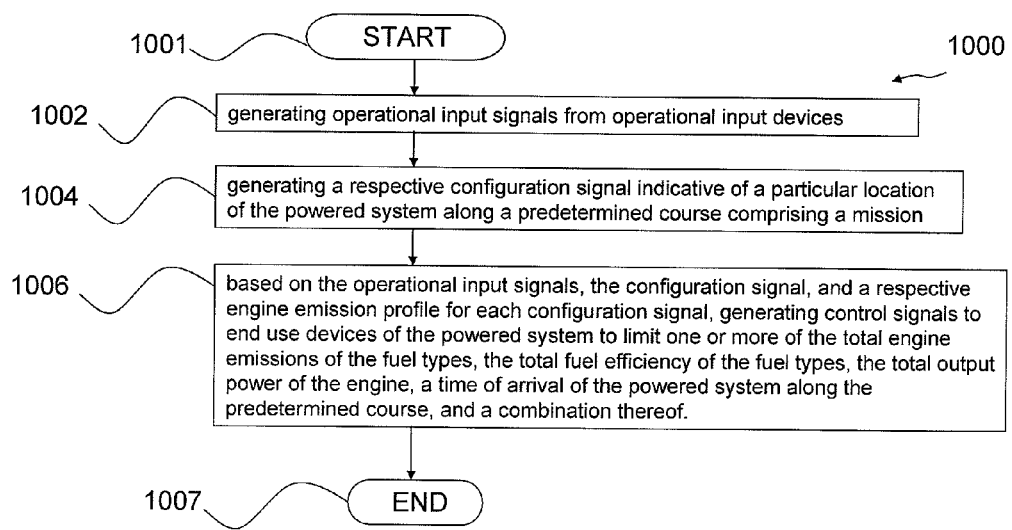
FIG. 14 is a flow chart illustrating an example method of operating of the system illustrated in FIG. 9.

FIG. 14 illustrates a flowchart depicting one embodiment of a method 1000 for controlling a powered system including an engine operating on a plurality of fuel types. The method 1000 begins at 1001 by generating 1002 operational input signals from operational input devices. The method 1000 further includes generating 1004 a respective configuration signal 35' indicative of a particular external domain 9', 11' of the powered system, such as a location along a predetermined course 8'. Based on the operational input signals, the configuration signal 35', and a respective engine operating profile for each configuration signal, the method 1000 includes generating 1006 control signals to a plurality of components 12', 14', 16', 18' of the powered system to limit one or more of the total engine emissions of the plurality of fuel types, the total fuel efficiency of the plurality of fuel types, the total output power of the engine, a time of arrival of the powered system along the predetermined course, and a combination thereof, before the method 1000 optionally ends at 1007. The components include a fuel delivery system for the plurality of fuel types.

For stationary applications, upon commissioning equipment including the configurable powered system 100', generating (block 912) a respective configuration signal 35' includes generating a configuration signal indicative of a destination location for the equipment for self-configuring the equipment for a particular engine profile upon arrival at the destination location. The operational input signals include flow rate signals indicative of the remaining fuel volume of each respective fuel type remaining in each fuel tank.

With reference again to FIG. 12, the powered system translates between a first external domain 9' and a second external domain 11'. When a request is made for performance according to the first external domain 9', the controller may respond to a first configuration signal to generate a first set of control signals 40', 42', 44'. These signals may include a first set of valve signals at the fuel tanks to configure the engine operation based on a ratio of fuel types according to a first stored engine operating profile. Upon receiving a request for performance according to a second external domain 11', the controller responds to a second configuration signal 39' to generate a second set of control signals 46', 48', 49'. These signals include a second set of valve signals to the fuel tanks to configure the engine operation based on a ratio of fuel types according to a second stored engine operating profile.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, any use of the terms "first," "second," etc., do not denote any order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A system comprising:
a controller configured to be disposed onboard a powered system having an engine configured to consume two or more different fuels to power the powered system, the controller configured to generate and communicate one or more control signals to valves associated with two or more different fuel tanks that store the two or more different fuels, wherein the controller is configured to change the one or more control signals to change which of the two or more different fuels are supplied to the engine at different times.

2. The system of claim 1, wherein the controller is configured to receive a location of the powered system from an input device and to change the one or more control signals responsive to and based on the location received from the input device.

3. The system of claim 2, wherein the controller is configured to compare the location of the powered system with different engine operating profiles associated with different geographic areas, and the controller is configured to change the one or more control signals based on the engine operating profile associated with the geographic area in which the location of the powered system is disposed.

4. The system of claim 1, wherein the controller is configured to change the one or more control signals to change which single fuel of the two or more different fuels is supplied to the engine for consumption by the engine.

5. The system of claim 1, wherein the controller is configured to change the one or more control signals to change one or more of an amount or rate of at least one of the two or more different fuels that are concurrently supplied to the engine.

6. The system of claim 1, wherein the controller is configured to determine an emission restriction on an allowable amount of emission that can be generated by the engine, and the controller is configured to change the one or more control signals to prevent an amount of emission generated by the engine from exceeding the emission restriction.

7. The system of claim 1, wherein the controller is configured to determine a restriction on an allowable amount of audible noise that can be generated by the engine, and the controller is configured to change the one or more control signals to prevent an amount of audible sound generated by the engine from exceeding the restriction.

8. The system of claim 1, wherein the controller is configured to determine amounts of the two or more different fuels being carried onboard the powered system and to change the one or more control signals based on the amounts of the two or more different fuels.

9. A method comprising:
determining one or more fuels to supply to an engine of a powered system that is configured to consume two or more different fuels to power the powered system;
communicate one or more control signals to one or more valves associated with two or more different fuel tanks that store the two or more different fuels; and
changing supply of the one or more fuels to the engine based on the one or more control signals received at the one or more valves.

10. The method of claim 9, further comprising receiving a location of the powered system from an input device and changing the one or more control signals responsive to and based on the location received from the input device.

11. The method of claim 10, further comprising comparing the location of the powered system with different engine operating profiles associated with different geographic areas, wherein changing the one or more control signals occurs based on the engine operating profile associated with the geographic area in which the location of the powered system is disposed.

12. The method of claim 9, wherein changing the supply of the one or more fuels changes which single fuel of the two or more different fuels is supplied to the engine for consumption by the engine.

13. The method of claim 9, wherein changing the supply of the one or more fuels includes changing one or more of an amount or rate of at least one of the two or more different fuels that are concurrently supplied to the engine.

14. The method of claim 9, further comprising determining an emission restriction on an allowable amount of emission that can be generated by the engine, wherein the supply of the one or more fuels is changed to prevent an amount of emission generated by the engine from exceeding the emission restriction.

15. The method of claim 9, further comprising determining a restriction on an allowable amount of audible noise that can be generated by the engine, wherein the supply of the one or more fuels is changed to prevent an amount of audible sound generated by the engine from exceeding the restriction.

16. The method of claim 9, further comprising determining amounts of the two or more different fuels being carried onboard the powered system, wherein the supply of the one or more fuels is changed based on the amounts of the two or more different fuels.

17. A system comprising:
a controller configured to determine a location of a powered system having an engine configured to consume two or more different fuels during movement of the powered system, the controller also configured to determine a restriction on operation of the powered system based on the location of the powered system, wherein the controller is configured change supply of one or more of the two or more different fuels based on the location and the restriction during the movement of the powered system.

18. The system of claim 17, wherein the restriction includes a limitation on an amount of emissions generated by the powered system.

19. The system of claim 17, wherein the restriction includes a grade of a route being traveled by the powered system.

20. The system of claim 17, wherein the restriction includes a limitation on audible noise generated by the powered system.

* * * * *